(12) United States Patent
Liedtke

(10) Patent No.: US 6,347,364 B1
(45) Date of Patent: Feb. 12, 2002

(54) SCHEDULABLE DYNAMIC MEMORY PINNING

(75) Inventor: Jochen Liedtke, Ossining, NY (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/197,028

(22) Filed: Nov. 20, 1998

(51) Int. Cl.[7] .............................................. G06F 12/00
(52) U.S. Cl. ...................... 711/163; 711/200; 711/203; 711/154
(58) Field of Search ................................. 711/154, 163, 711/165, 133, 152, 151, 203, 200, 100

(56) References Cited

U.S. PATENT DOCUMENTS

| | | | | |
|---|---|---|---|---|
| 5,202,990 A | * | 4/1993 | Saikawa ..................... 710/200 |
| 5,408,629 A | * | 4/1995 | Tsuchiva et al. ............. 711/151 |
| 5,426,747 A | * | 6/1995 | Weinreb et al. .............. 711/203 |
| 5,613,086 A | * | 3/1997 | Frey et al. ................... 711/152 |
| 5,649,139 A | * | 7/1997 | Weinreb et al. .............. 711/202 |
| 5,659,798 A | * | 8/1997 | Blumrich et al. ............. 710/26 |
| 5,721,870 A | * | 2/1998 | Matsumoto ................... 711/152 |
| 5,832,508 A | * | 11/1998 | Sherman et al. ............ 707/200 |
| 5,875,485 A | * | 2/1999 | Matsumoto ................... 711/152 |
| 5,946,711 A | * | 8/1999 | Donnelly ..................... 711/152 |
| 5,983,310 A | * | 11/1999 | Adams ........................... 711/6 |

* cited by examiner

Primary Examiner—Tuan V. Thai
(74) Attorney, Agent, or Firm—Scully, Scott, Murphy & Presser; Douglas W. Cameron, Esq.

(57) ABSTRACT

A system and method for enabling applications to pin a set of pages in memory for a predetermined duration in time. An application submits a request for pinning its memory for certain duration. As a compensation the applications may offer other currently mapped pages for replacement. The request may also include number of pages and duration of time. The request is granted with the constraint policies which the application is to follow. Such constraint policies include number of pages and length of time the pages may remain pinned in memory. When compensation pages are offered, those pages are replaced in place of the pages which are granted the privileged of being pinned. The present invention also provides page coloring compensation by including a compensation pool from where a compensation page having the same color as the one picked for replacement may be selected. The compensation pages offered by the application which are not used for compensating are returned subsequently to the application.

53 Claims, 20 Drawing Sheets

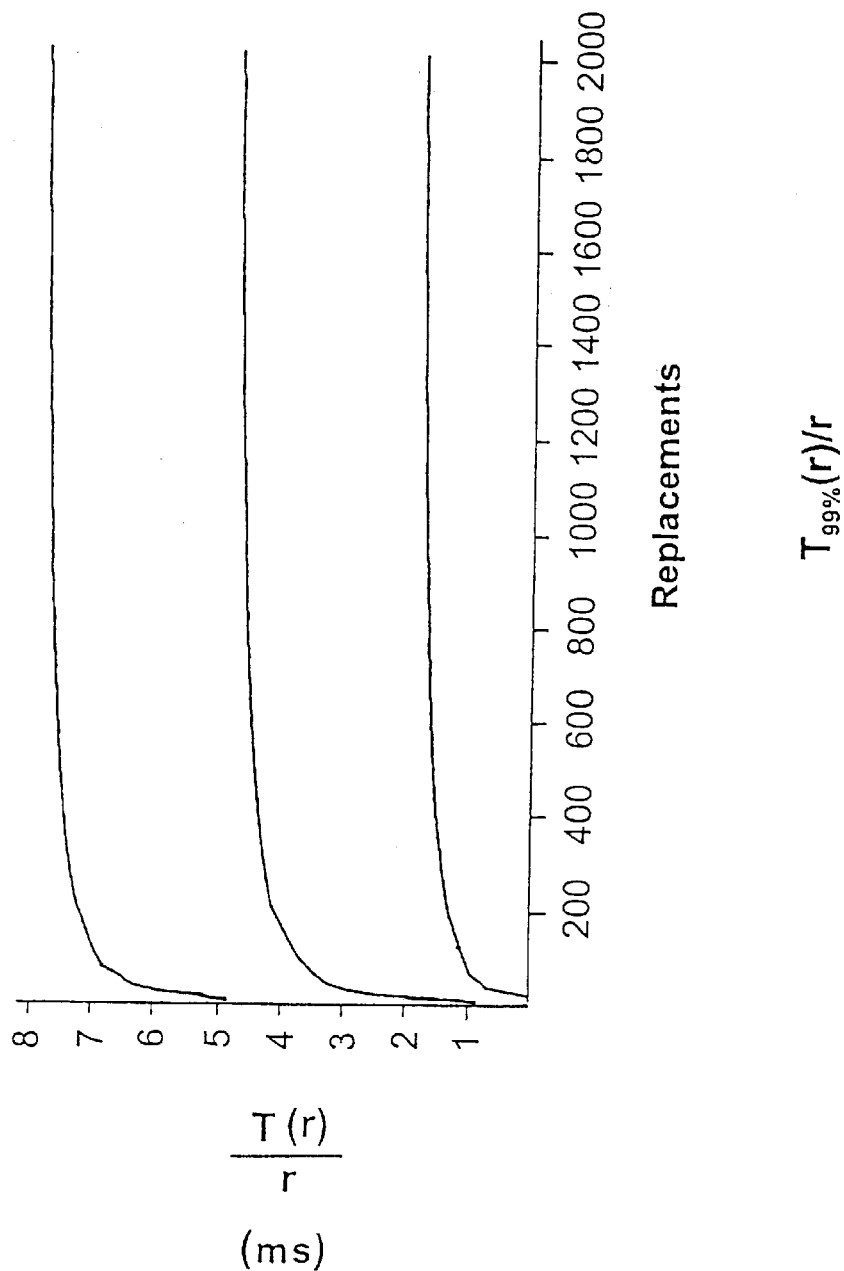

SCHEDULABLE DYNAMIC MEMORY PINNING

TECHNICAL FIELD

The present invention relates in general to computer memory management, and more particularly to dynamic scheduling of memory pinning.

PRIOR ART

Traditionally, pinning memory is a privileged capability that is not available to normal user tasks but only to the OS kernel, e.g., for device drivers. Pinning generally refers to an ability for pages to remain in main memory and not have to be swapped out, typically by a computer operating system. Pinning is controlled by the facts that the components are statically known, that they are trusted, and that they have most restrictive policies for minimizing pinning.

However, other applications can also benefit from more liberal pinning policies. Such applications include device drivers run at user level which use direct memory access (DMA), real-time systems that rely on no-page-fault guarantees, and database-like applications that perform drastically better when some application-specific pages are pinned for a shorter or longer time interval. Therefore, it is highly desirable to provide static and dynamic pinning capabilities to applications as well.

Static pinning is used for pinning driver or real-time code and data, certain buffers, etc. In static pinning, pages are pinned for a very long time, if not permanently. A method is usually necessary to guarantee a basic functionality of some components. For example, static pinning can be controlled by traditional quota-based methods.

Dynamic pinning has two characteristic properties: pages are pinned for short periods only, and it is dynamically decided which and how many pages are pinned. Dynamic pinning is highly desirable and useful in many instances, including the following:

1. For transmitting a file, e.g., over a network. The network system pins the file partially (or entirely) in memory for the transmission period. This enables zero-copy transmission, i.e., avoids copying data into network buffers, and therefore, increases the performance substantially.
2. For communicating data to a non-real-time component, a real-time application temporarily requests pinned memory.
3. A real-time application temporarily asks for pinned memory. Although, the application would meet its deadlines and fulfill its minimal quality-of-service contracts without this memory, additional buffers can substantially improve its quality of service or reduce the overall system load, i.e., make more processor time available for non-real-time tasks.
4. Based on its application-specific knowledge, a database system decreases overall swapping by pinning dynamically some of its pages.

In all of the following cases, applications negotiate with the system whether, how many and how long pages can be pinned for them. Furthermore, dynamic pinning needs to be controlled by a policy that coordinates the requests of multiple independent applications, restricts the negative effects that pinning has on other paged applications. In addition the controlling policy needs to be a policy which can be enforced against untrusted applications. Accordingly, it is highly desirable to provide dynamic pinning with scheduling policies.

For example, if a user task can dynamically ask to pin some of its currently mapped pages for a certain period of time, a scheduling algorithm in the pager is needed to decide whether the request will be granted, denied, or granted with less pages or for a shorter period. Such a dynamic-pinning scheduler should have some of the following properties.

1. It should work in combination with any reasonable page-replacement algorithm.
2. It should not rely on pinning-related trust in the applications. For instance, restricting pinning to device drivers is not acceptable.
3. It should be robust against denial-of-service attacks. Pinning must not offer new possibilities for monopolyzing a system.
4. It should adapt quickly to changing system load. An application should be granted a high amount of pinned pages if enough unused memory is available. Conversely, less pinning should be granted if memory is getting short.
5. The basic scheduler should be enabled to add specific policies that, e.g., handle applications that are prioritized or weighted differently.

Therefore, to resolve the above issues, it is highly desirable to have a pinning policy which includes time boundaries. Furthermore, applications cannot be relied upon to unpin their pages on a timely basis. Therefore, it is highly desirable to have enforcement policies which can necessitate unpinning. As is apparent to those skilled in the field of art, the properties 3 and 4 above exclude simple solutions such as giving each application a fixed quota of n/m pinned pages in a context of n physical pages and m applications.

SUMMARY OF THE INVENTION

Accordingly, to resolve the above shortcomings, the present invention is a method and apparatus for providing a dynamic scheduling of memory pinning where the applications may request for and be allowed to pin pages in memory based on predetermined criteria and according to given constraints.

The pin engine of the present invention evaluates whether to grant a pinning request based on preexisting criteria such as availability of system resources, and returns a response to the application indicating whether the pinning request was granted. With the granting of the pinning request, the pin engine specifies certain constraints which the application must uphold. Such constraints may include a requirement that the application unpin all or some of its pages after an expiration of time predetermined by the pin engine, again based on existing criteria which may include system resources, and the current load of the system. The pin engine also has an enforcement capability to unpin the pages pinned by the applications, whenever a necessity arises.

More specifically, the present invention provides the compensated pinning mechanism wherein an application desiring to pin certain number of its pages offers substitute pages for replacement. An application initially makes a pinning request to a pin engine, including with its request, desired properties such as the actual pages for pinning, number of pages for pinning, and duration of time for a requested page to remain pinned. The application also includes the pages which are currently mapped as compensation pages which may serve as substitute for the pinned page during page replacement.

In addition, the present invention provides color-sensitive compensation mechanism wherein a compensation page having the same color as the pinned page is used for replacement. Having the same color compensation page avoids potential subsequent cache conflicts and can result in performance improvement.

For providing the above functionalities, the present invention includes a pin engine which grants or denies pin requests from the applications based on evaluation performed according to the available system resources, a compensation selector for selecting a compensating page, i.e., a substitute page. When a page replacer which according to any known replacement algorithm picks a page for swapping and the picked page is a pinned or to-be-pinned page, the compensation selector selects another page for the page replacer to use in place of the replacer picked page. The compensation selector selects the compensating page from a compensation set, which typically includes the compensation pages offered by the application requesting the pinning. The compensation selector also may select the compensating page from a compensation pool having a larger set of compensation pages supplied by any of the system resources or applications.

Furthermore, when selecting a compensating page, the compensation selector may rank the compensation pages based on any number of predetermined criteria. Such criteria may include but not limited to color sensitivity. For example, a compensation page having the same color as the page replacer picked page which is pinned or to-be-pinned may be ranked high whereas other pages may be ranked low. Accordingly, the compensation selector selects the highly ranked pages before selecting the others.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which:

FIG. 20 is a graph illustrating that for replacements greater or equal to 500, the stochastic lower bound can be approximated linearly.

DETAILED DESCRIPTION OF THE PREFERRED EMBODIMENT OF THE INVENTION

Figure 1:
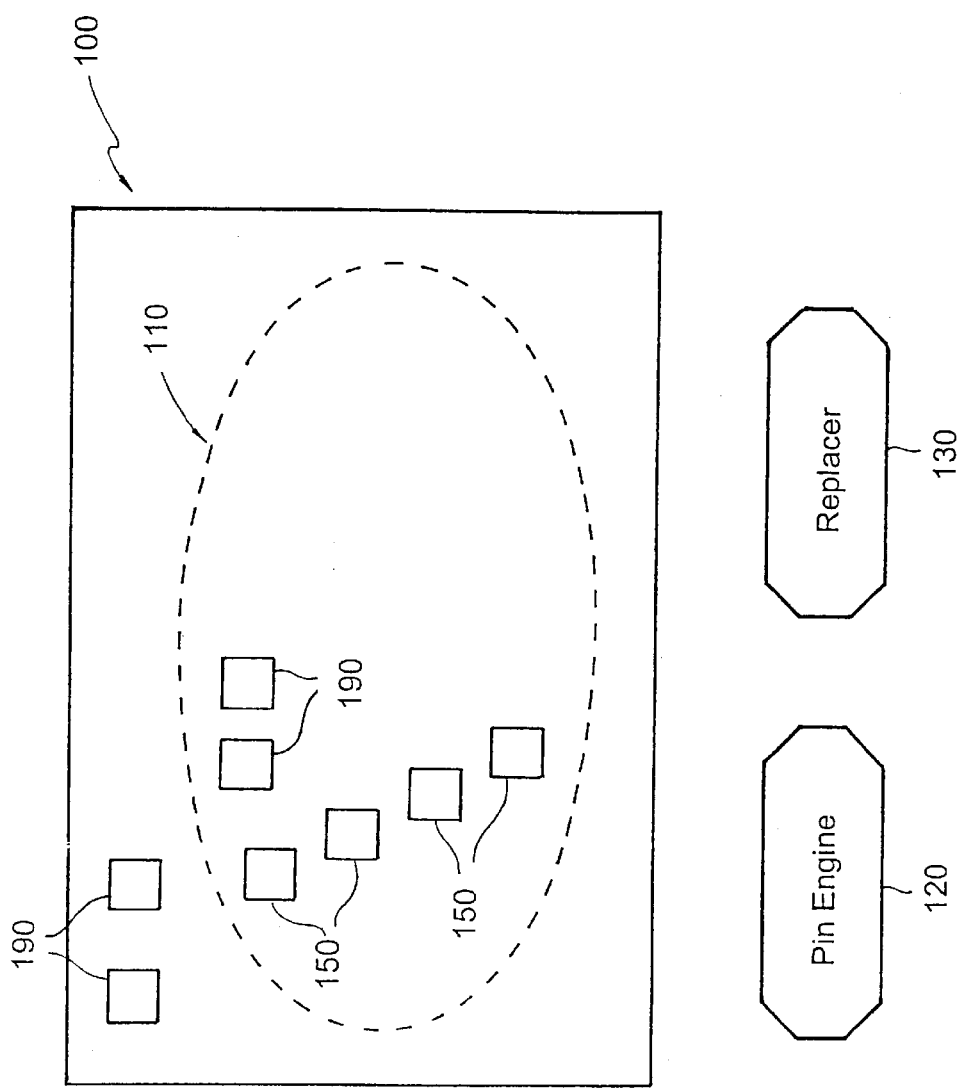
FIG. 1 illustrates a first preferred embodiment of the present invention.

The present invention is directed to a method and apparatus for providing a dynamic scheduling of memory pinning. Applications may request to pin pages in memory for a period of time. The present invention employs constraint pinning concept, wherein pinning is granted with constraints. The constraints may include, but not limited to, a number of pages which may be pinned and a duration for which pages may remain pinned in memory. The applications may also include with their pin requests, desired constraints under which to pin pages in memory.

The present invention also includes the concept of compensated pinning for providing dynamic scheduling of memory pinning. Compensated pinning addresses the problem of how pages which are currently already mapped can be pinned. If an application desires to pin for a certain duration, k of its pages that are currently mapped, the application is required to offer the pager x other pages for compensation. These compensation pages are owned by the same application and are currently mapped to the physical memory. For page replacement, the pager can then use the compensation pages instead of the pinned pages. Based on this idea, for any reasonable page-replacement algorithm, the pinning cost can be compensated to nearly 100% for a certain period of time.

If an application A desires to pin k pages and offers x compensation pages, all k+x pages must be owned by A and must be currently mapped. The application A touches all k+x pages to classify them as recently used for the page-replacement algorithm. Then it asks for pinning of the pages.

The following compensation algorithm is added to the original page-replacement algorithm. Initially, all k+x pages are marked as not linked to a compensating page. The x pages are put into the set $X_A$ of A's compensation pages, also called A's compensation set. "Compensation pages" refer to the pages which are available for future compensation but are not yet used for compensating. A page that is currently used for compensating is referred to as a "compensating page." A page is "compensated", if it has associated a compensating page.

Whenever the original page replacement picks one of the k+x pages, i.e., a pinned page or a compensation page, the compensation algorithm is applied. Consider an example where a page frame f is picked originally. If f is not yet linked to a compensation page, i.e., f is not compensated, an arbitrary page f' is taken out of $X_A$ and removed from this set, then f is linked to f'. Thus, f' becomes compensating page for f. Subsequently, f' is used instead of f for replacement. If the page f' is already linked as compensating page to f, f' is used instead of f. An example of a pseudo-code segment for implementing the above-described algorithm is as follows.

compensate (f)
   IF f.linked=nil THEN
      f':=one of $X_A$;
      $X_A:=X_A\setminus\{f'\}$;
      f.linked :=f'
   FI;
   use f.linked instead of f for replacement.

When $X_A$ is empty, replacing not-yet-replaced pages may no longer be compensated. The application A is referred to as compensated until the set $X_A$ becomes empty. Thereafter, the application A is referred to as uncompensated.

Figure 2:
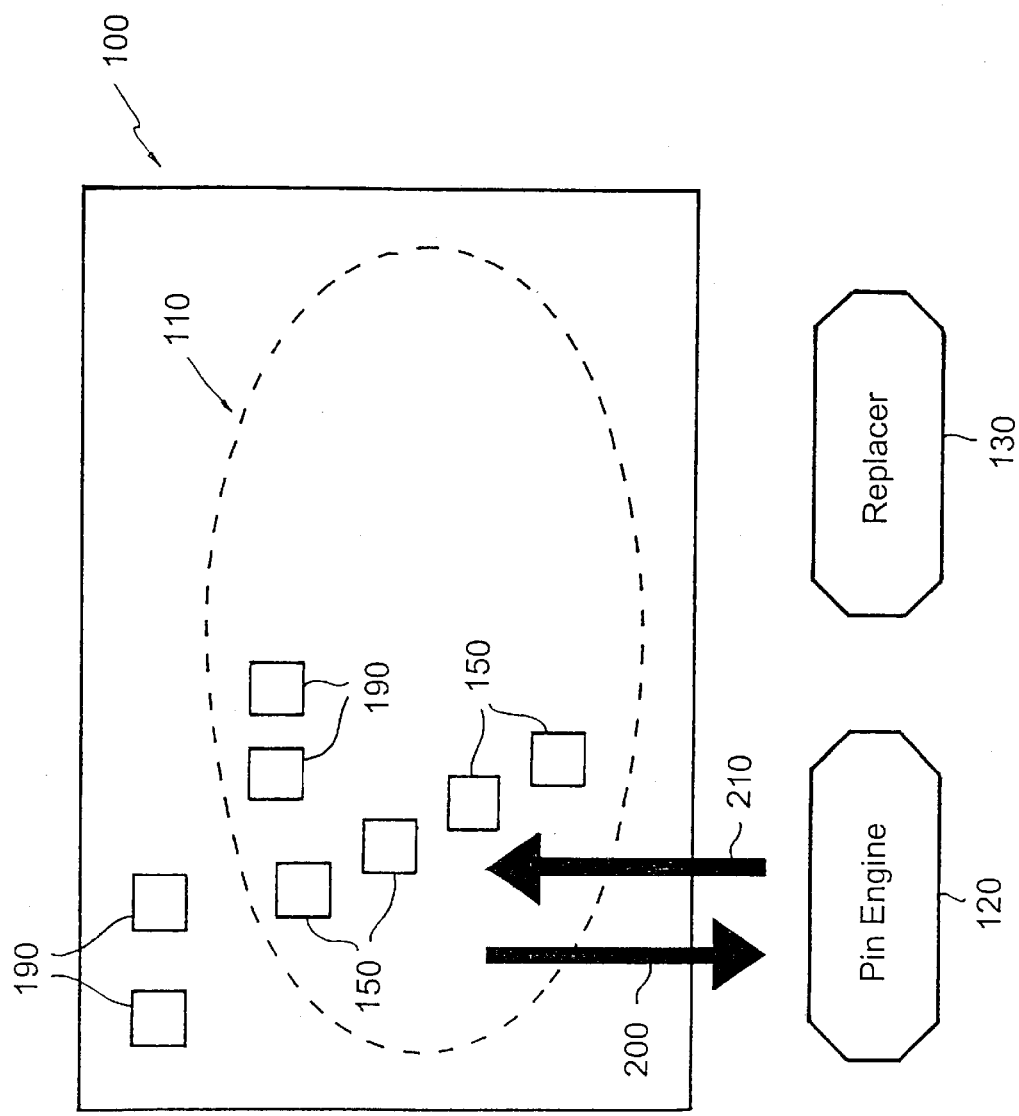
FIG. 2 illustrates the application sending a pin request to a pin engine of the present invention.

FIG. 1 illustrates a first preferred embodiment of the present invention. The present invention includes a main memory 100, an application 110, a pin engine 120 and a replacer 130. The application 110 uses pages of the main memory 100, where some pages 150 of the application are to be pinned. Other pages 190 are not related to pinning or are not related to the application. FIG. 2 illustrates the application 110 sending a pin request 200 to the pin engine 120. The pin engine replies with a pin constraint 210.

Figure 3:
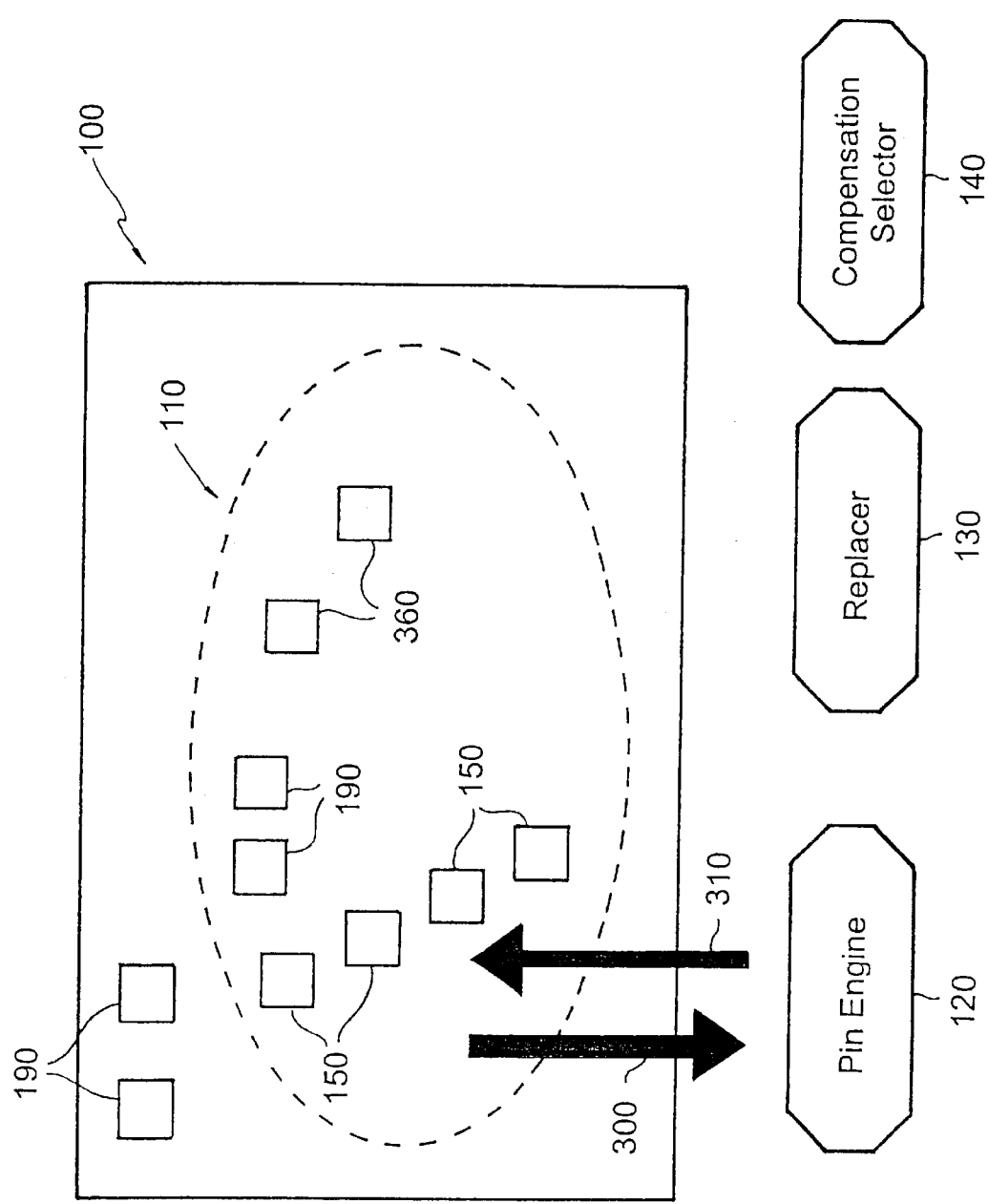
FIG. 3 illustrates a second preferred embodiment of the present invention where the application offers some of its mapped pages as compensation pages to the pin engine.

FIG. 3 illustrates a second preferred embodiment of the present invention where the application 110 offers some of its mapped pages as compensation pages 360 to the pin engine 120. The pin request 300, thus includes the compensation offer. Accordingly, the pin engine 120 uses the compensation offer to determine the pin constraint 310 it grants. The compensation selector 140 is a unit that controls how to compensate further replacements.

Figure 4:
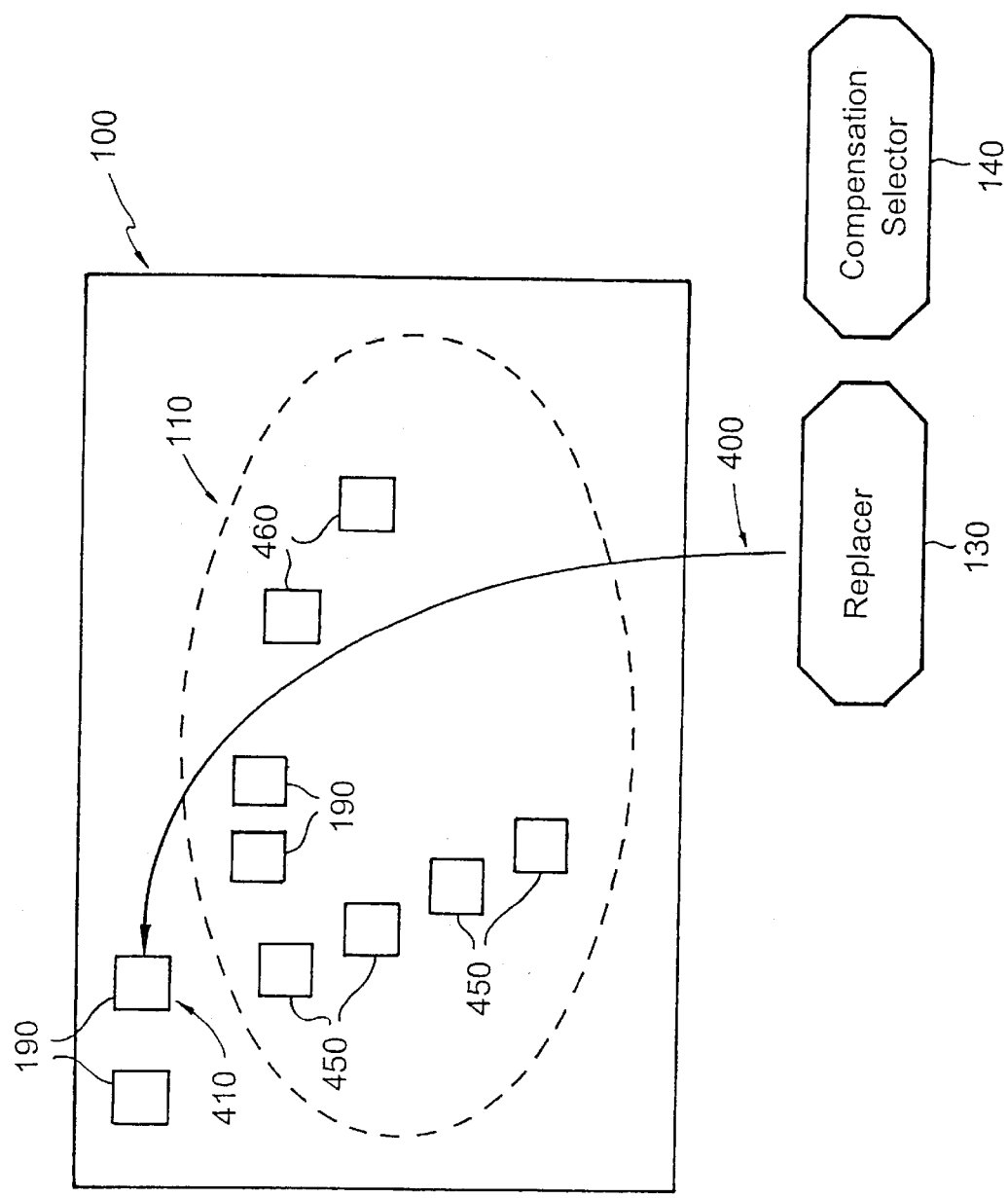
FIG. 4 illustrates an example of the replacer selecting a page for replacement in the second preferred embodiment of the present invention.
Figure 5:
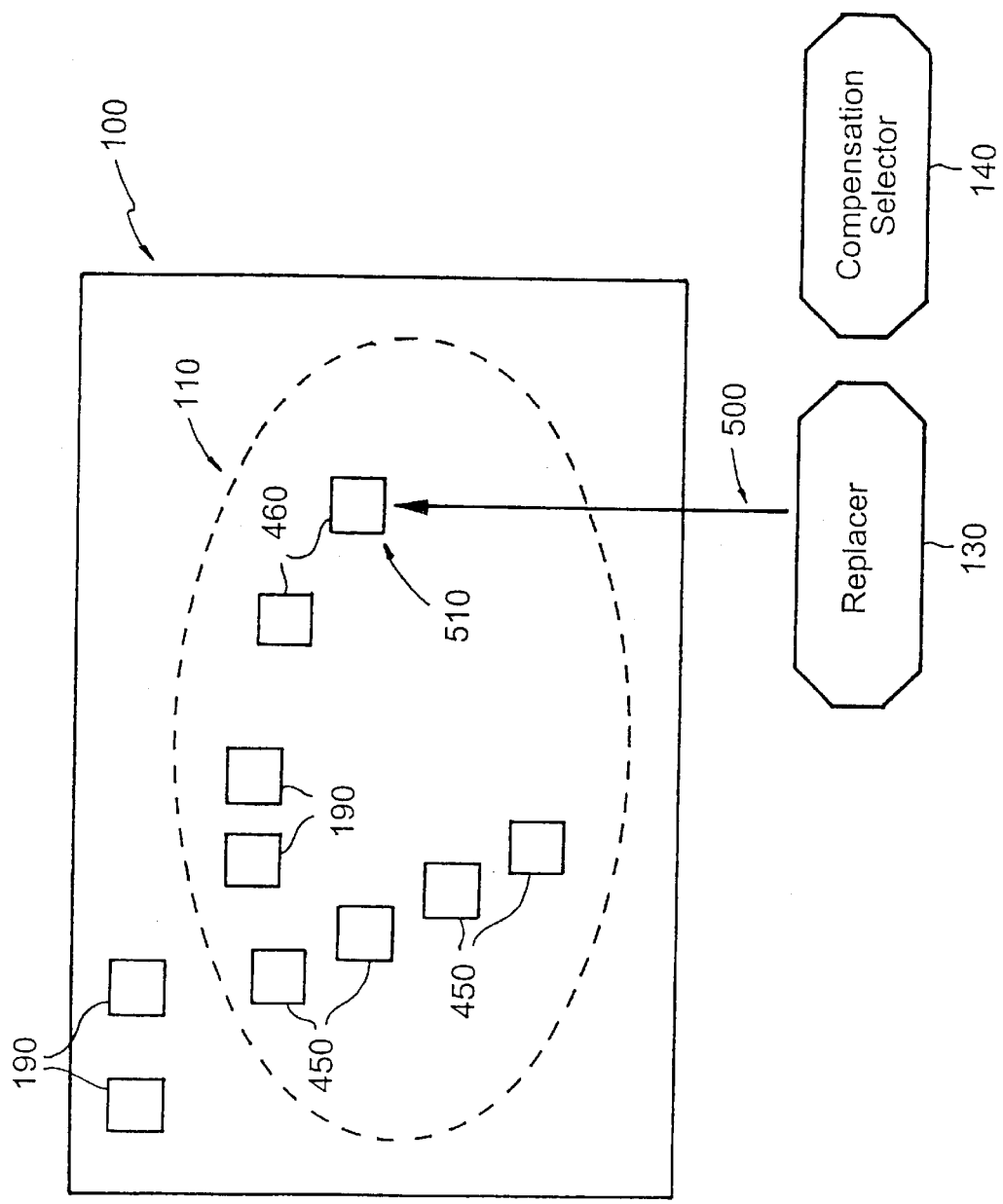
FIG. 5 illustrates a scenario in the present invention in which the replacer picks a page that is a compensation page for replacement.
Figure 6:
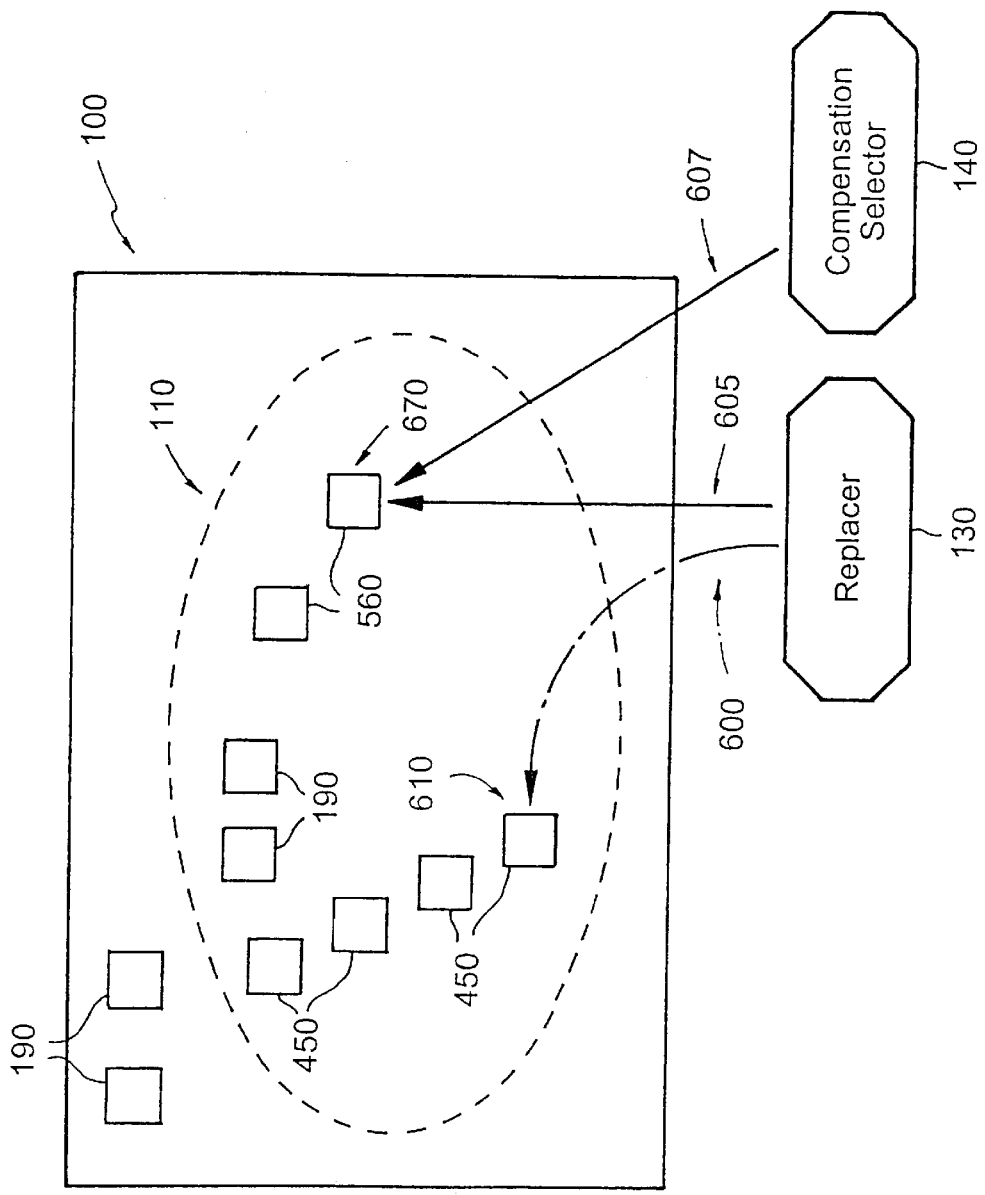
FIG. 6 illustrates a scenario in which the replacer picks a page that is one of the pinned page.

FIG. 4 illustrates an example of the replacer 130 selecting a page 410 for replacement in the second preferred embodiment of the present invention. When the replacer 130 picks a page 410 which is among the pages 190 not related to pinning, the picked page 410 is replaced as usual. Similarly, in FIG. 5, if the replacer 130 picks a page 510 that is a compensation page 460, the picked page 510 is replaced as usual. FIG. 6 illustrates a scenario in which the replacer 130 picks a page 610 that is one of the pinned page 450. The compensation selector 140, in response, selects one of the compensation pages 560. This compensation selector selected page 670 is then replaced instead of the picked page 610.

Figure 7:
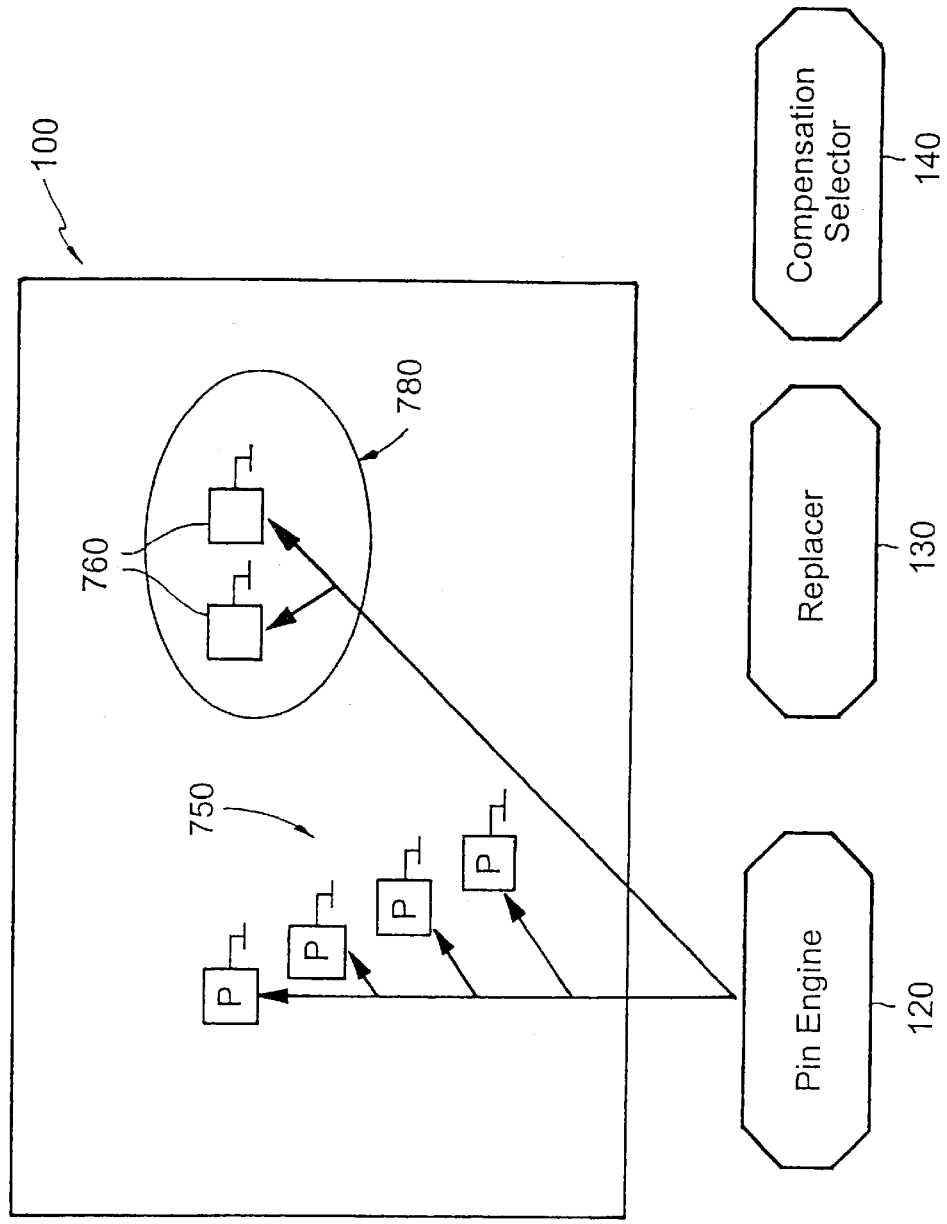
FIG. 7 illustrates a third preferred embodiment of the present invention.
Figure 8:
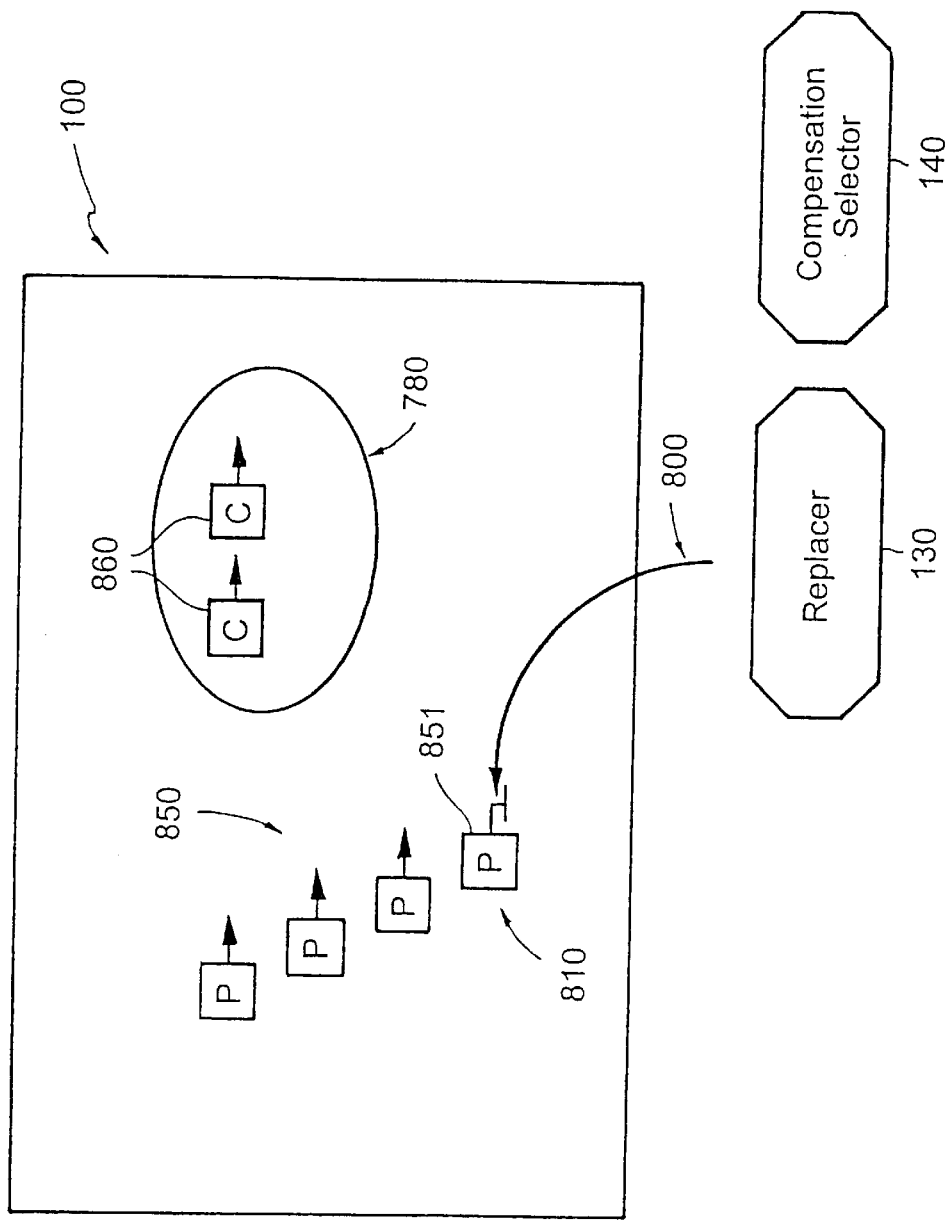
FIG. 8 illustrates an example of the replacer picking an uncompensated pinned page, when the compensation set is not empty in the third preferred embodiment of the present invention.
Figure 9:
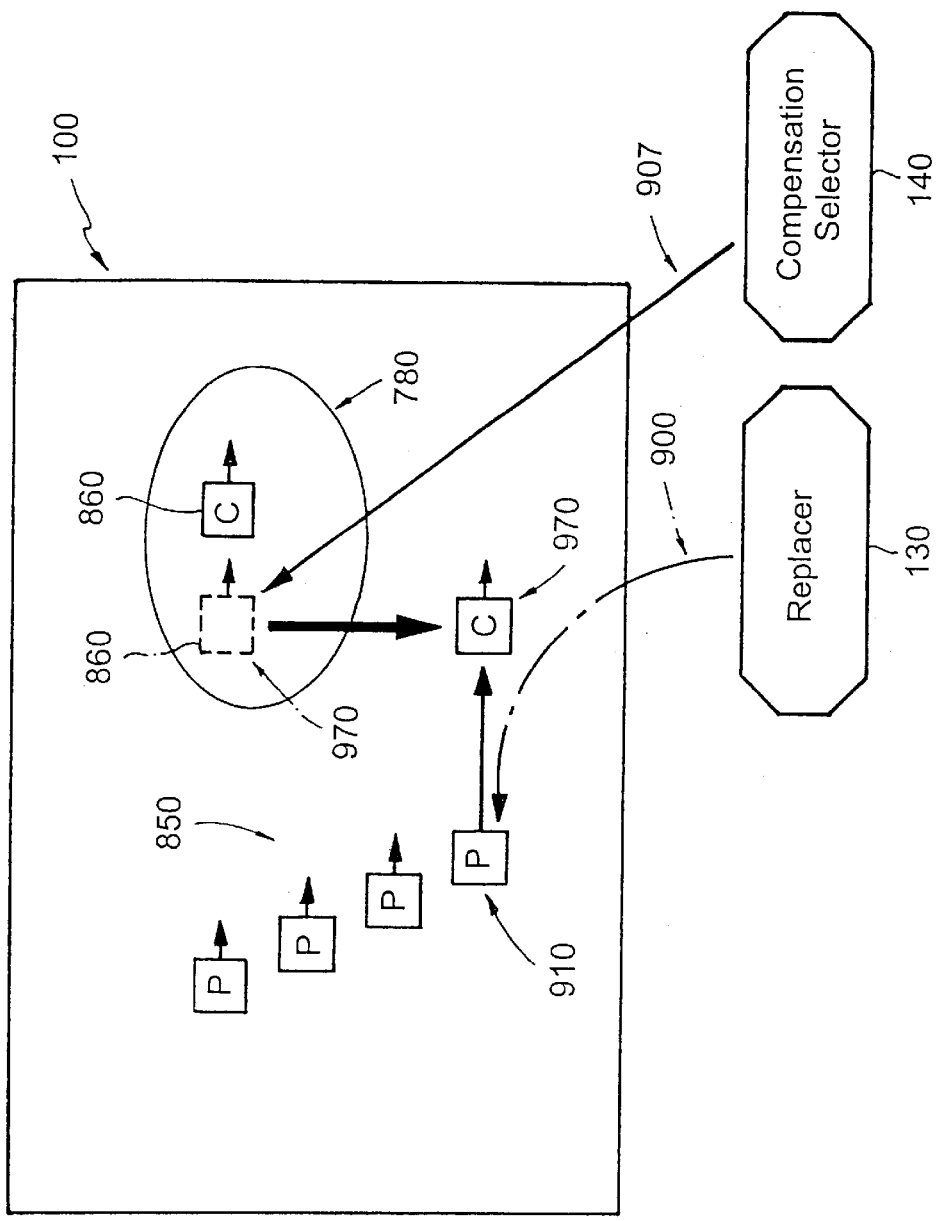
FIG. 9 is an example showing the compensation selector selecting a page from the compensation set.

FIG. 7 illustrates a third preferred embodiment of the present invention. According to this embodiment, the application 110 requests to pin some of its mapped pages 750 and offers other mapped pages as compensation pages 760 to the pin engine 120. The pin engine 120 sets all pages 750 to pinned and uncompensated. Additionally, the pin engine 120 enters the compensation pages 760 into the compensation set 780 and sets the pages 760 as uncompensated. In this embodiment, as shown in FIG. 8, when the replacer 130 picks an uncompensated pinned page 810, and the compensation set 780 is not empty, i.e., the compensation set 780 includes at least one compensation page 860 which may be uncompensated or compensated, the compensation selector 140 as shown in FIG. 9 selects one page 970 from the compensation set 780. The compensation selector 140 then removes the selected page 970 from the compensation set 780, and links the selected page 970 as the compensating page to the picked page 910. The picked page 910 becomes thus compensated. An example for replacing a compensated page will be described with reference to FIG. 15.

Figure 10:
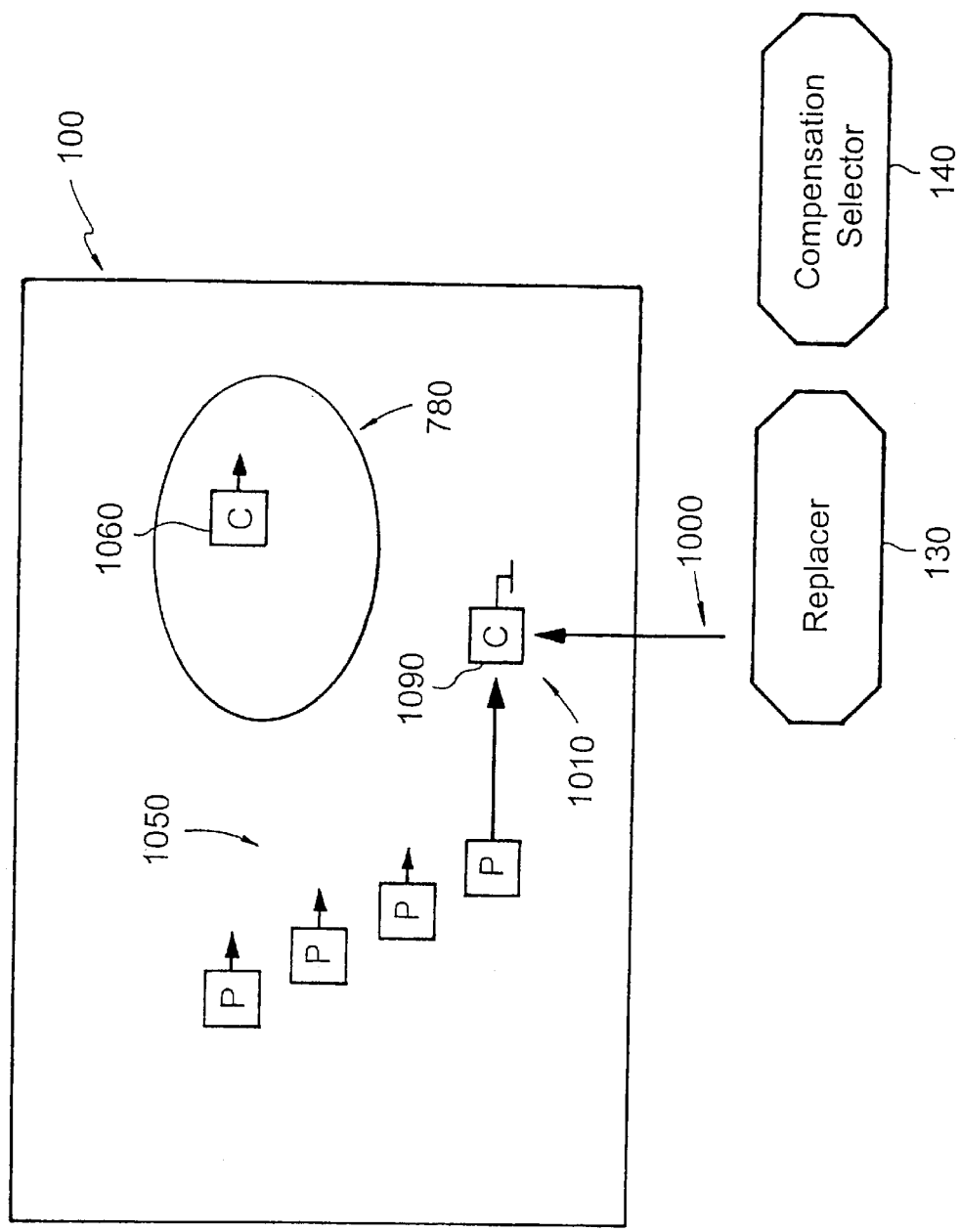
FIG. 10 illustrates an example of the replacer picking an uncompensated compensating page for replacement.
Figure 11:
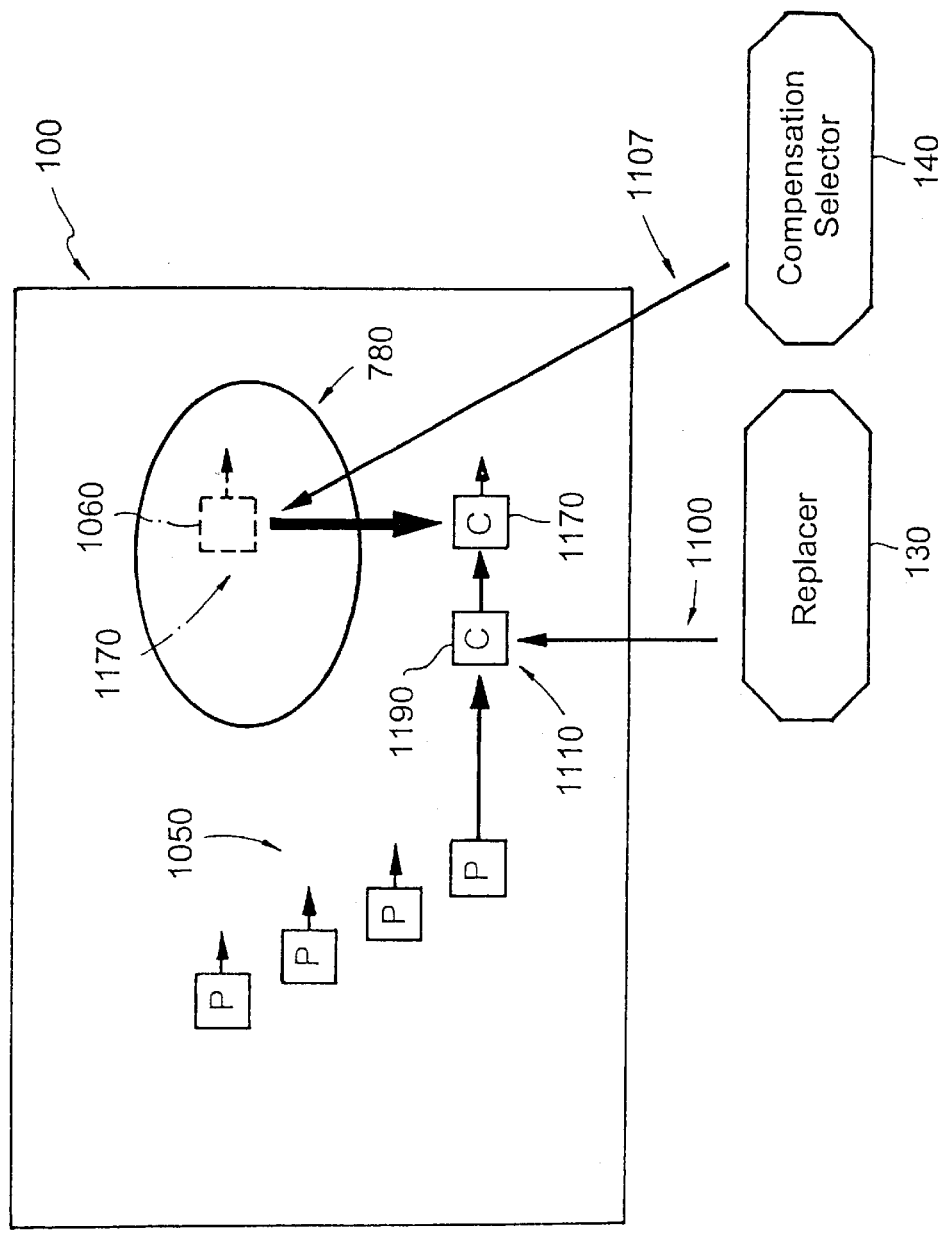
FIG. 11 illustrates an example of the compensation selector selecting one page from the compensation set.

Furthermore, in the third preferred embodiment, when a replacer 130 picks an uncompensated compensating page 1010, as shown in FIG. 10, and the compensation set 780 is not empty, i.e., the compensation set 780 includes at least one compensation page 1060 which might be uncompensated or compensated, the compensation selector 140 as shown in FIG. 11 selects one page 1170 from the compensation set 780. The compensation selector 140, then removes the selected page 1170 from the compensation set 780, and links the selected page 1170 as the compensating page to the picked page 1110. The picked page 1110 thus becomes compensated. An example of replacing a compensated page will be described with reference to FIG. 15.

Figure 12:
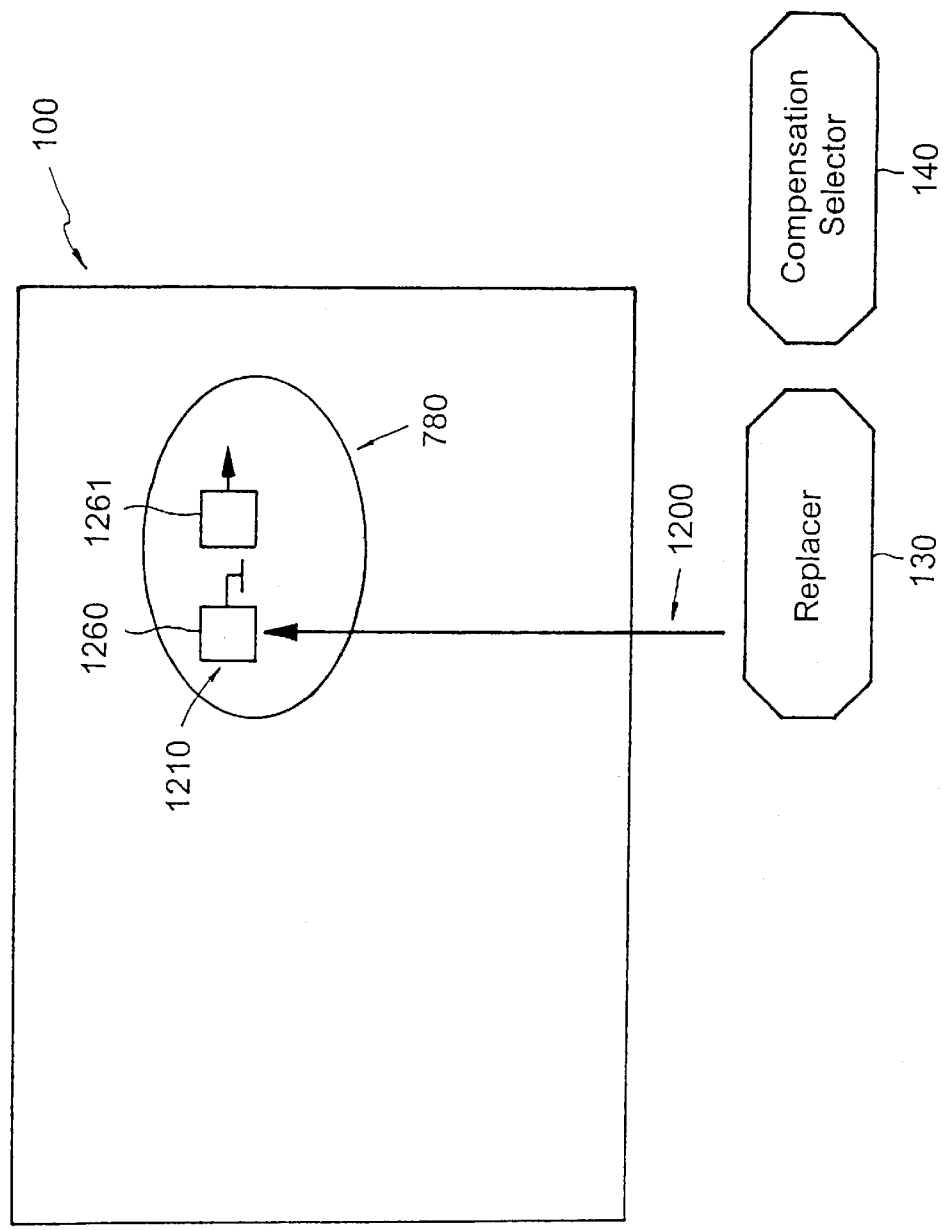
FIGS. 12 and 13 illustrate an example scenario in which the replacer picks an uncompensated compensation page.
Figure 13:
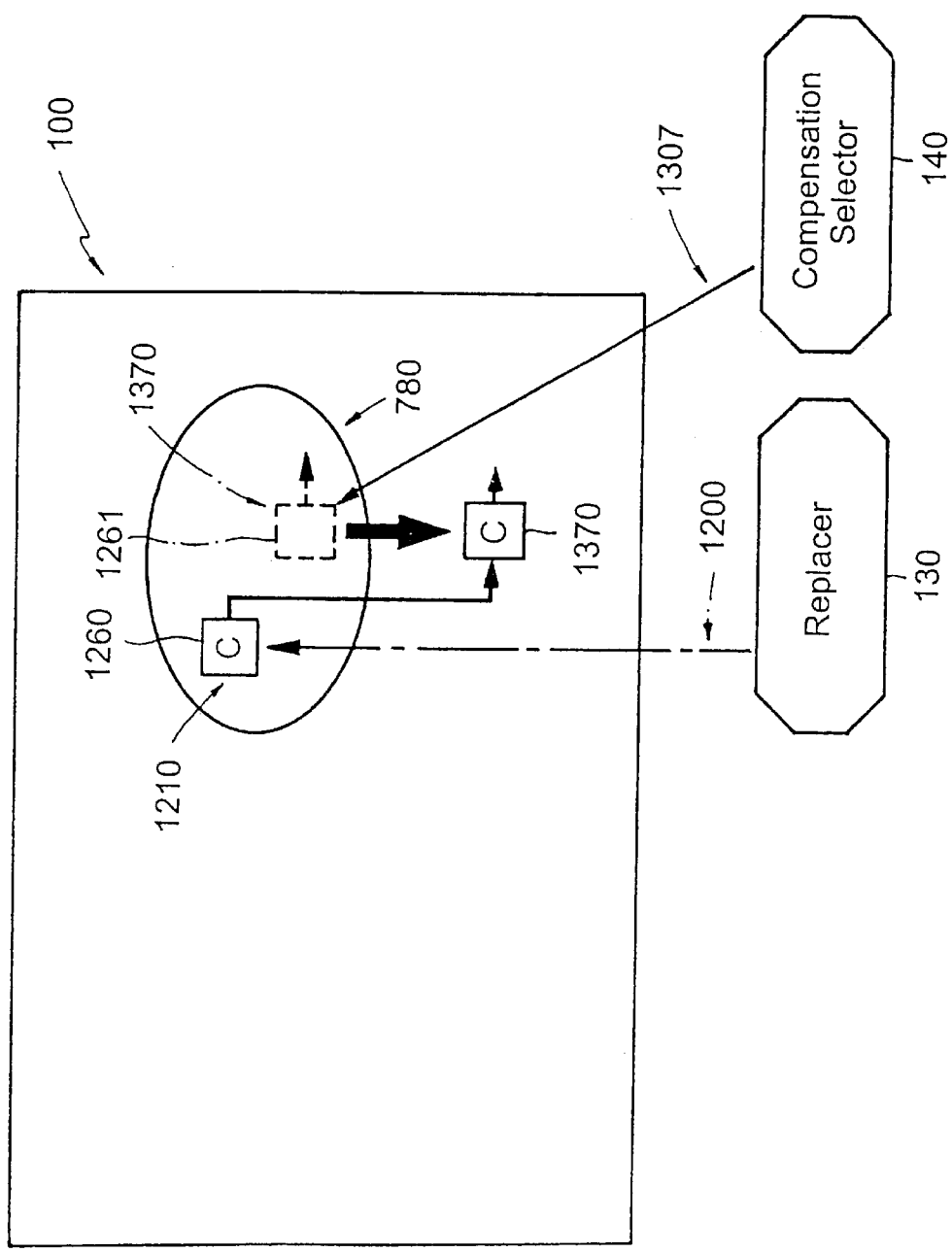

FIG. 12 illustrates an example scenario when the replacer 130 picks an uncompensated compensation page 1210. As shown in FIG. 13, if the compensation selector 140 selects a page 1370 from the compensation set 780 such that the selected page 1370 differs from the picked page 1210 and is further a compensation page 1261 that might itself be uncompensated or compensated, then the compensation selector 140 removes the selected page 1370 from the compensation set 780 and links the selected page 1370 as the compensating page to the picked page 1210. The picked page 1210 becomes thus compensated.

Figure 14:
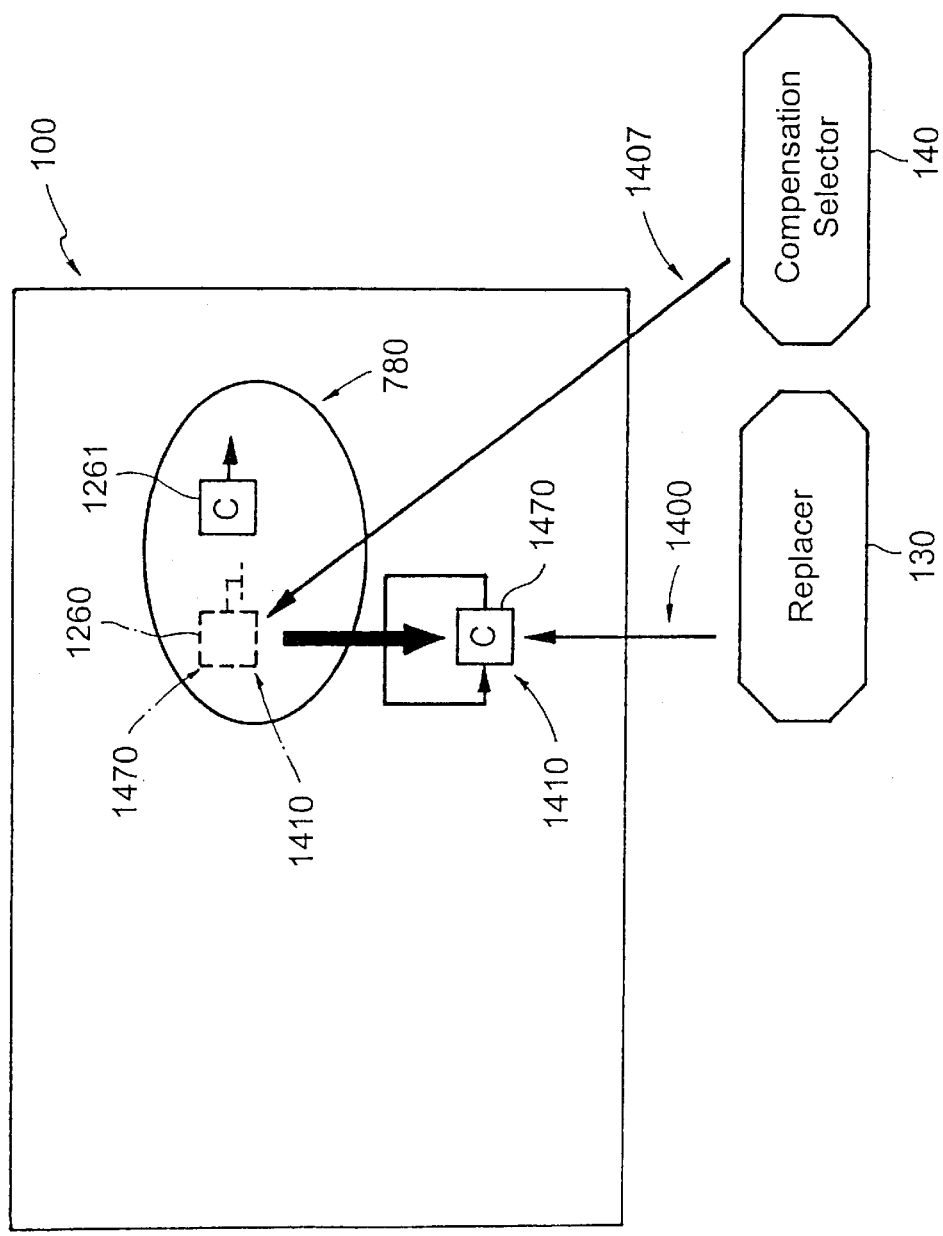
FIG. 14 illustrates a scenario in which the compensation selector selects a page that is the same as the one the replacer picked.

FIG. 14 illustrates a scenario when the compensation selector 140 selects a page which is the same as the one the replacer 130 picked. In FIG. 14, if the compensation selector 140 selects the picked page 1410 itself as selected page 1470 from the compensation set 780, then the compensation selector 140 removes the selected page 1470 from the compensation set 780, and links the selected page 1470 as the compensating page to the picked page 1410, i.e., itself. The picked page 1410 thus becomes compensated.

Figure 15:
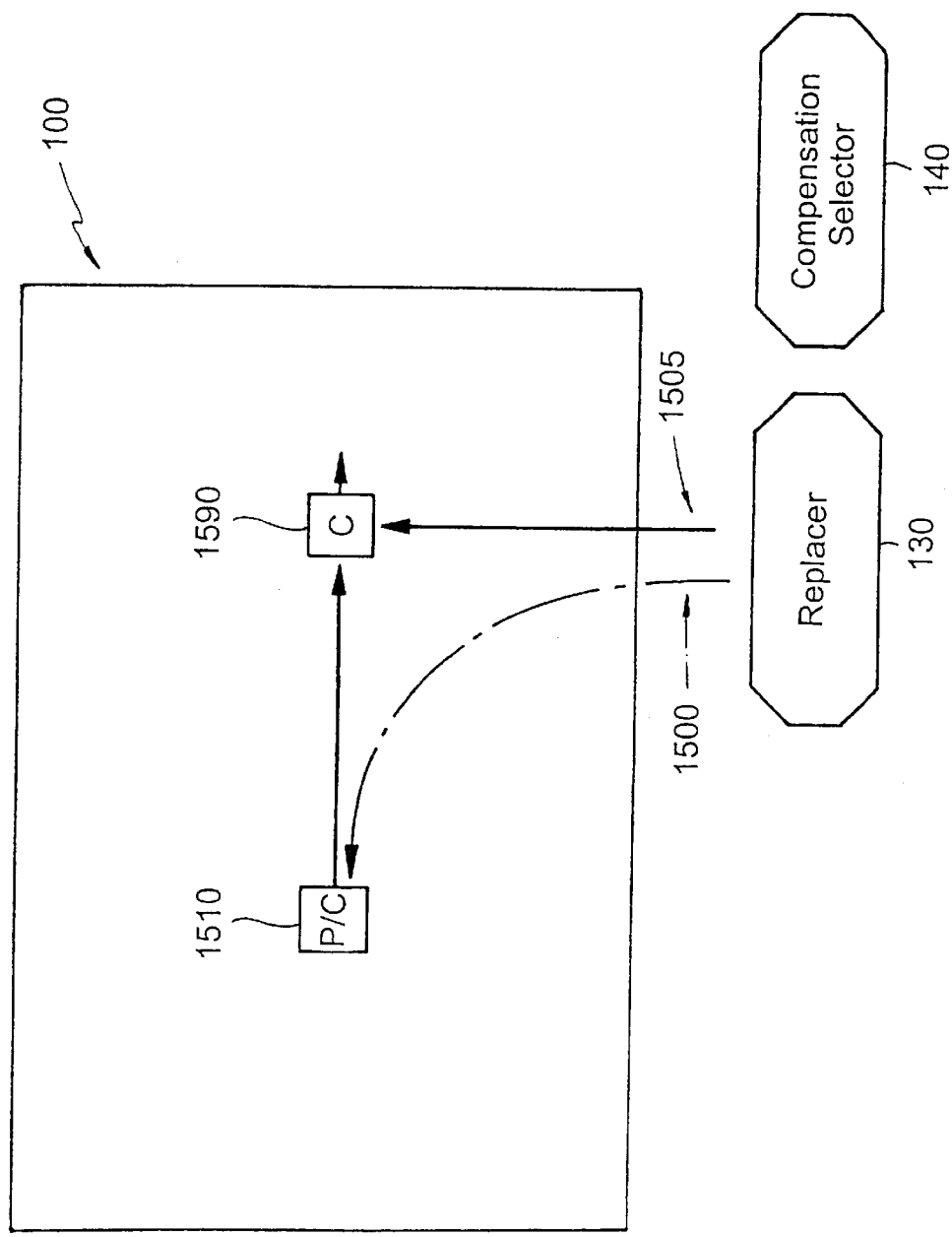
FIG. 15 illustrates an example showing how a compensated page may be replaced in the third preferred embodiment of the present invention.

FIG. 15 shows how a compensated page may be replaced in the third preferred embodiment. When a replacer 130 picks a compensated page 1510 which is compensated by a compensating page 1590, no matter whether the picked page 1510 is a compensated pinned page, a compensated compensation page or a compensated compensating page, the replacer replaces the compensating page 1590 instead of the picked page 1510.

Figure 16:
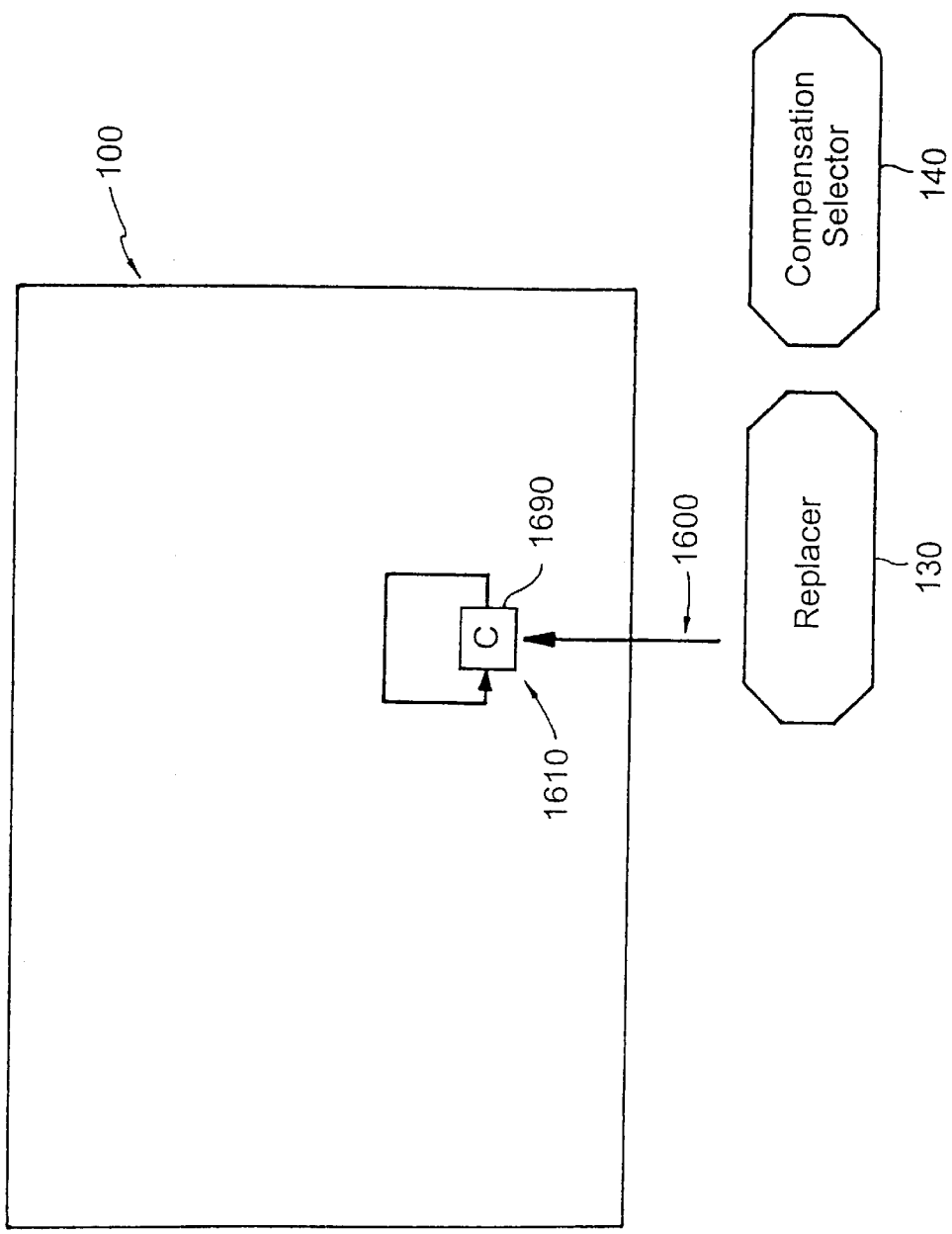
FIG. 16 shows and example of a scenario in which a replacer picks a compensated page 1610 that has itself as compensating page 1690.

In FIG. 16, when a replacer 130 picks a compensated page 1610 that has itself as compensating page 1690, the replacer 130 replaces the compensating page 1690, i.e., the picked page 1610.

The number of replacements that leave A compensated is called its compensation length C. The concrete compensation length may be as low as x. However, this event has a very low probability of occurrence. Therefore, instead of this absolute lower bound, a stochastic lower bound $C_P$ for the compensation length is used. It means that with probability P, the concrete compensation length is at least $C_P$. For instance, in 99% of all pinning operations, compensation pages may be available for up to $C_{99\%}$ replacements.

With a lower bound $T_{min}$ for the minimum time required for one replacement operation, the stochastic pinning time is at least $C_P*T_{min}$. For k pages to be pinned and x offered compensation pages, the pager could guarantee a pinning time of tau $=C_P*T_{min}$. Moreover, better stochastic bounds than the simple $C_P*T_{min}$ may be derived.

As long as compensation works for a period of tau, the paging behavior is unaffected by pinning the k pages, and pinning does not shrink the memory that is effectively available for swapping. However, as soon as a compensation underflow is detected, the pager must replace an unpinned page without compensation. As a result, the available swapping memory effectively shrinks. Such situations, however, occur infrequently. On the average, their probability is even lower than 1−P because in most cases the effective time for r replacements is much higher than $T_{min}*r$.

An application pins k mapped pages and offers x also mapped pages for compensation. Let p be an upper bound for the probability that the original replacement algorithm picks a given page of the k+x pages per replacement event. There is no requirement that the replacement be equally distributed but only that p is an upper bound for all of the k+x pages.

If the physical memory available for paging is n pages, p=1/n is a good choice for all reasonable page-replacement algorithms and for arbitrary high paging load. Because the k+x pages are currently and heavily used, the p=1/n assumes only that the replacement probability for a currently used page is at least not higher than for an average page.

Of an interest is the probability P(r) that r replacements can be compensated. At first, P(r) is calculated under the assumption that the probability to be picked in one replacement for any of the k+x pages is constant and equals p. Then P(r) is a lower bound for the case that p is an upper bound for these probabilities.

From the compensation algorithm, conclusion can be drawn that P(r) is the probability that the original replacement algorithm for r replacements picks at most x different pages from the set of the k+x pages.

Consider an example where i pages from this set are selected. Then the probability that in r replacements each of the given i pages is picked at least once and all other of the k+x pages are never picked is $$P_i(r) = \begin{cases} (1-(k+x)p)^r & \text{if } i = 0 \\ \sum_{j=1}^{r-i+1} \binom{r}{j} p^j P_{i-1}(r-j) & \text{if } i > 0 \end{cases}$$

Multiplying $P_i(r)$ by the number of combinations how i pages can be selected from k+x pages and summing over all possible values of i results in $$P(r) = \sum_{i=0}^{x} \binom{k+x}{i} P_i(r)$$

Only $P_0(r)$ depends directly on p. Smaller values for p result in larger values for $P_0(r)$ and thus also for $P_i(r)$ and P(r). Therefore, P(r) is a lower bound for the probability that r replacements can be compensated if the pick probability for each of the k+x pages for r replacements remains less than or equal to p.

Table 1 illustrates stochastic compensation lengths for p=1/n and various memory sizes n. The margin probability is always 99%, i.e., $C_{99\%}$ is calculated.

TABLE 1

| | $C_{99\%}$ | | | |
|---|---|---|---|---|
| k + x | 16M n = 4096 | 64M n = 16384 | 256M n = 65536 | 1024M n = 262144 |
| +1 | 37 | 128 | 590 | >2000 |
| +2 | 105 | 421 | 1683 | >2000 |
| 16 + 4 | 293 | 1170 | >2000 | >2000 |
| +8 | 728 | >2000 | >2000 | >2000 |
| +16 | 1571 | >2000 | >2000 | >2000 |

TABLE 1-continued

| | $C_{99\%}$ | | | |
|---|---|---|---|---|
| k + x | 16M n = 4096 | 64M n = 16384 | 256M n = 65536 | 1024M n = 262144 |
| +1 | 2 | 9 | 38 | 152 |
| +2 | 7 | 28 | 111 | 445 |
| +4 | 21 | 82 | 326 | 1301 |
| 256 + 8 | 57 | 223 | 886 | >2000 |
| +16 | 141 | 555 | >2000 | >2000 |
| +32 | 323 | 1278 | >2000 | >2000 |
| +64 | 689 | >2000 | >2000 | >2000 |
| +128 | 1360 | >2000 | >2000 | >2000 |
| +1 | 1 | 2 | 9 | 38 |
| +2 | 2 | 7 | 28 | 112 |
| +4 | 6 | 21 | 83 | 328 |
| 1024 + 8 | 16 | 58 | 225 | 896 |
| +16 | 39 | 144 | 568 | >2000 |
| +32 | 89 | 338 | 1336 | >2000 |
| +64 | 194 | 748 | >2000 | >2000 |
| +128 | 405 | 1580 | >2000 | >2000 |
| +1 | n/a | 1 | 2 | 9 |
| +2 | n/a | 2 | 7 | 28 |
| +4 | n/a | 6 | 21 | 83 |
| 4096 + 8 | | 16 | 58 | 226 |
| +16 | | 39 | 145 | 571 |
| +32 | | 90 | 342 | 1351 |
| +64 | | 198 | 765 | >2000 |
| +128 | | 422 | 1651 | >2000 |

Most pagers keep lists of unused or free page frames. Pages become, for example, free when a task or a memory object is deleted. Allocating a new page of anonymous memory in such an empty page frame can be very cheap. If the frame was already zeroed upon deleting the old object, allocation might cost only 10 microseconds ($\mu$s) per page. Therefore, the $C_p$ compensatable replacement would be used up very quickly. Counterintuitively, this seems to mean that tolerable pinning periods become shorter as more pages are unused in the system. However, it is not true if the pagers do not replace non-free pages as long as there are free page frames available. As long as there are free page frames left, fresh allocations (replacements) can be compensated without using anyone of the x compensation pages. If F fresh allocations leave the x compensation pages untouched, up to $C_p$ "real" replacements that happen while no free frame is available can be compensated in addition to the F fresh allocations. Therefore, fresh allocations are classified as non-replacements and are ignored when calculating worst-case compensated pinning times.

In a paging system that needs at least one disk access per replacement, a minimum replacement time may be 10 ms. However, most paging systems need no disk access but only memory initialization for allocating a fresh page. Accordingly, a pager that supports copy-on-write can sometimes avoid a disk access by copying the original page within main memory. In those cases, minimal replacement time is very low, i.e., $T_{min}=T_{mem}=100$ $\mu$s. Since only some of the replacements can be handled in such a short time—others need one or even two disk accesses—the average replacement time will be one or two order of magnitudes higher. Therefore, $C_P*T_{mem}$ is obviously a bad estimate for tau. Therefore, pure memory replacements that cost $T_{mem}$ or more are differentiated from those replacements which involve at least one disk access and cost $T_{disk}$ or more. Although there is no better estimate for a single replacement than $T_{mem}$, better stochastic estimates can be found for sequences. In most systems, at least some disk replacements in a long sequence can be expected. It is very unlikely that, for example, 1000 $T_{mem}$ replacements happen in a row.

Consider an example where a replacement happens to be a disk replacement with probability q and a memory replacement with 1–q. The probability that exactly i disk replacements happen in r replacements is $$Q_i(r) = \begin{cases} (1-q)^r & \text{if } i = 0 \\ \sum_{j=0}^{r-i} (1-q)^j q Q_{i-1}(r-j-1) & \text{if } i > 0 \end{cases}$$

Since multiple threads operate concurrently, all memory replacements can in the worst case happen in parallel to disk replacements. On the other hand, disk replacements are serialized, i.e., we assume only one disk drive. Since the probability for a thread to have j memory replacements in a row followed by a disk replacement is $(1-q)^j q$, runs of consecutive memory replacements will not be very long, $1/q-1$ on average. Under high replacement load, all threads will therefore be very quickly synchronized by disk replacements. It is very unlikely that a thread continuously and densely fires memory replacements such that r replacements happen in parallel to only very few disk replacements. Therefore, in this model, only those memory replacements that happen between the beginning of a disk replacement and the beginning of the next disk replacement are overlapped with the first disk replacement.

To make sure that r replacements take at least time T, at least $[T/T_{disk}]$ disk replacements need to happen in the r total replacements. Accordingly, the probability that r replacements take at least time T is $$Q_T(r) = \sum_{i=\left[\frac{T}{T_{disk}}\right]}^{r} Q_i(r)$$

This permits calculation of the stochastic lower bound $T_Q(r)$: with probability Q, r replacements will take at least time $T_Q(r)$. Table 2 shows some stochastic lower bounds for a margin probability of 99%.

TABLE 2

| | $T_{99\%}$ | | |
|---|---|---|---|
| | disk:memory | | |
| replacements | 28:80 | 50:50 | 80:20 |
| 200 | 0.27s | 0.84s | 1.46s |
| 500 | 0.80s | 2.24s | 3.79s |
| 1000 | 1.71s | 4.63s | 7.70s |
| 2000 | 3.58s | 9.48s | 15.08s |

FIG. 20 illustrates that, for r>=500, the stochastic lower bound can be approximated linearly: $T_{99\%}(r) >= T_{eff} * r$ which $T_{eff} = T_{99\%}(500)$. The constant $T_{eff}$ depends on the distribution of memory replacements and disk replacements, i.e., the OS architecture as shown in Table 3. Table 4 shows effective pinning periods tau=$T_{eff}C_{99\%}$ for a system with 20% disk replacements, i.e., $T_{eff}$=1.6 ms. The table is based on the compensation lengths of table 1. Cases with compensation lengths below 500 are ignored.

TABLE 3

Stochastic minimal cost $T_{eff}$ per replacement for sequences of at least 500 replacements and a margin probability of 99%.

| | disk:memory | | |
|---|---|---|---|
| | 28:80 | 50:50 | 80:20 |
| $T_{eff}$ | 1.60 ms | 4.48 ms | 7.58 ms |

TABLE 4 tau = $T_{99\%}$ × 1.6 ms

| k + x | 16M<br>n = 4096 | 64M<br>n = 16384 | 256M<br>n = 65536 | 1024M<br>n = 262144 |
|---|---|---|---|---|
| +1 | | | 0.9s | >3.6s |
| +2 | | | 2.7s | >3.6s |
| 16 + 4 | | 1.9s | >3.6s | >3.6s |
| +8 | 1.2s | >3.6s | >3.6s | >3.6s |
| +16 | 2.5s | >3.6s | >3.6s | >3.6s |
| +4 | | | | 2.1s |
| 256 + 8 | | | 1.4s | >3.6s |
| +16 | | 0.9s | >3.6s | >3.6s |
| +32 | | 2.0s | >3.6s | >3.6s |
| +64 | 1.1s | >3.6s | >3.6s | >3.6s |
| +128 | 2.2s | >3.6s | >3.6s | >3.6s |
| 1024 + 8 | | | | 896 |
| +16 | | | 0.9s | >3.6s |
| +32 | | | 2.1s | >3.6s |
| +64 | | 1.2s | >3.6s | >3.6s |
| +128 | | 2.5s | >3.6s | >3.6s |
| +16 | n/a | | 1.2s | 0.9s |
| +32 | n/a | | 2.6s | 2.2s |
| +64 | n/a | | | >3.6s |
| +128 | | | | >3.6s |

The modified page replacement with pinning k pages is isomorphic to the original page replacement without pinning but with using k+x pages. Note that compensation is applied to pinned pages and compensation pages. As a result, up to x of the k+x pages are mapped one-to-one to compensation pages. In particular, since compensation pages are picked only by indirection and never directly, they are not replaced more frequently.

Compensation does not depend on the page-replacement algorithm. Scheduling dynamic pinning is reduced to the well-known problem of how to schedule paging. Pinning and compensation is local. Pinning decisions and scheduling can be done per application. Different applications interfere as usual by paging but not additionally by pinning.

The compensation pages are like a price an application pays for pinning. The application has to offer enough to cover the stochastic worst-case costs. On the average, much less compensation pages are required, i.e., the application usually overpays. The unused compensation pages are kept so that they can be used for subsequent pinning. Thus, an application first has to deposit the maximum price but at the end pays only the concrete costs. In a similar way, an application can transfer its left compensation pages to another application or a server. For instance, a network server could collect compensation pages and redistribute them to its clients.

An example of an Application Programming Interface (API) which may be used for implementing the present invention will now be described. In the present invention, one compensation object $X_A$ per application and pager is postulated. $X_A$ includes all currently allocated compensation pages of A. With the AllocateCompensationPage operation, the application may ask the pager to allocate a new compensation page in memory and add it to $X_A$. Similarly, with the ReleaseCompensationPage operation, the pager may be asked to release one page. Independent of the application, the pager may remove pages from $X_A$ either to compensate pinning or to replace a page in the normal way if the application currently pins no pages. The CompensationPages operation communicates to the application the number of pages that are currently in $X_A$. Compensation pages can also be transferred to other applications. They are automatically added to the receiver's compensation object.

With the MakeCompensationPages (pageset) operation, an application may communicate to the pager that the specified pages may be used for compensation. The according page frames are added to the compensation object.

The Pin (pageset) operation requests to pin the specified pageset. Depending on the current size of $X_A$, the pager returns the current number x of compensation pages and the guaranteed pinning period tau. If there are already pages pinned for this application, the specified pages are added to the set of already pinned pages. Since this addition is a set addition, pages or entire pagesets can be pinned more than once. However, CompensationPages and tau are always updated.

The Pin(pageset) operation pins only mapped pages. If one or more of the specified pages are not mapped it returns also the set of pages that could not be pinned.

The Unpin (pageset) operation unpins the specified pages. Additional code examples are described below.

Adaptive Pinning
    AdaptivePin (pageset, tau)
        T =: now + tau,
        DO
            Pin (pageset) -> tau';
            IF tau' < epsilon THEN return failure FI;
            Work for (min(tau'-epsiplon, T-now))
        UNTIL now >= T OD.
Map and Pin
    MapAndPin (pageset)
        Unmapped := pageset;
        x := CompensationPages;
        WHILE unmapped != emptyset DO
            access first unmapped page;
            allocate sufficient compensation pages;
            Pin (pageset) -> (x, tau, unmapped)
        OD.
Sequential Pin and Release
    SequentialPinAndRelease (pageset)
        WHILE pageset != emptyset DO
        Pin (pageset);
        work on wome pages;
        Unpin (PagesDone);
        MakeCompensationPages (PagesDone)
    OD.

Some page-replacement policies are color-sensitive. The "term" color, as well known by the persons who are skilled in the art of computer memory management, refers to lower most bits of the page number in a memory addressing scheme. A transparent compensation in color-sensitive page replacement policies needs to preserve the color, i.e., originally picked page and associated compensation page would have to have the same color.

A simple solution is, for c colors, split the compensation problem into c same-color problems. For instance, a solution would be to replace n, k and x by n/c, k/c and x/c and then calculate P(r) as the probability that one color can be compensated with x/c compensation pages. Accordingly, the probability that all color can be compensated is $P(r)^c$. The last exponentiation results in relatively greater requirements for compensation pages. Table 5 shows results for 16 colors.

TABLE 5

| | Naive color-preserving compensation for 16 colors, $C_{00\%}$. | | | |
|---|---|---|---|---|
| k + x | 16M n = 4096 | 64M n = 16384 | 256M n = 65536 | 1024M n = 262144 |
| 16 + 16 | 6 | 26 | 104 | 416 |
| +64 | 11 | 39 | 153 | 609 |
| 256 + 128 | 32 | 121 | 477 | 1900 |
| +256 | 78 | 300 | 1187 | >2000 |
| +256 | 29 | 100 | 388 | 555 |
| 1024 + 512 | 64 | 234 | 914 | 1540 |
| +1024 | 128 | 474 | 1866 | >2000 |
| +512 | n/a | 74 | 271 | 422 |
| 4096 + 1024 | n/a | 162 | 611 | 1064 |
| +2048 | n/a | 327 | 1253 | >2000 |

A better solution is presented by the present invention for the color-preserving compensation. In particular, the present invention provides a color-preserving pool compensation technique based on the following concepts.

1. When the pager has to compensate a page for application A, instead from $X_A$, it picks a compensation page with the correct color from a central compensation pool. Then it removes a page from $X_A$ and adds it to the central pool. For removal from $X_A$, the pager picks a page with a color that is under-represented in the central pool, i.e., not necessarily the color that was just used for compensation.

2. Whenever an application allocates a new compensation page for its $X_A$, the pager checks which colors are low in the central pool and then tries to allocate a page with such a color. Over short or long, it will show up in the central pool and fill up the low color. Thus, buffering solves the colored compensation.

Figure 17:
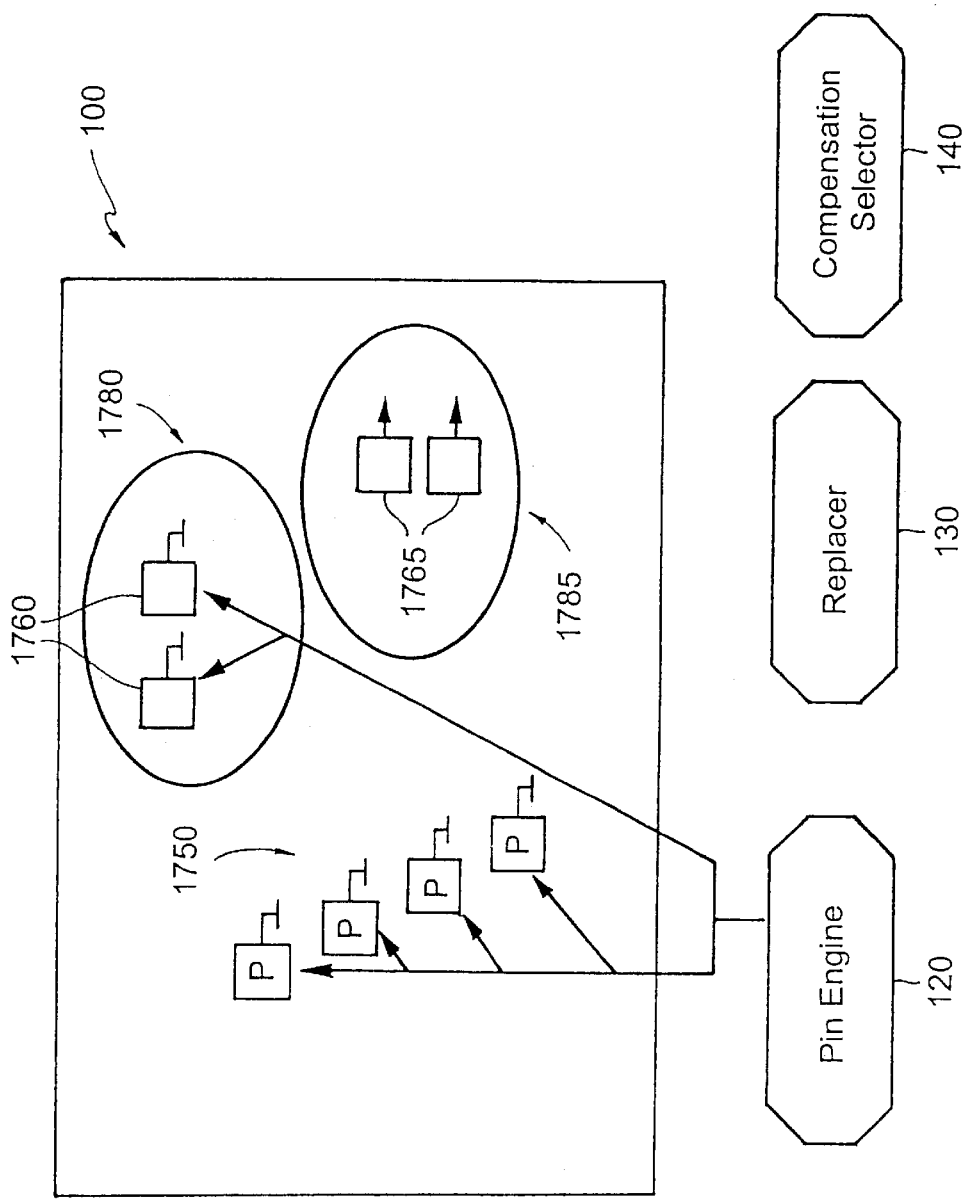
FIGS. 17–19 illustrate a fourth embodiment of the present invention.

The color compensation is described with reference to FIGS. 17–19 below which illustrate a fourth embodiment of the present invention. The fourth embodiment incorporates a page coloring scheme in the compensation process. As described above in reference with other embodiments and shown in FIG. 17, an application pins pages 1750 and offers compensation pages 1760. Pinned pages 1750 and offered compensation pages 1760 are set uncompensated and the offered compensation pages 1760 are inserted into the compensation set 1780 that is associated with the application. Furthermore, the fourth embodiment includes at least one compensation pool 1785 associated with the application. The compensation pool 1785 is preloaded with a further set of compensation pages 1765.

Figure 18:
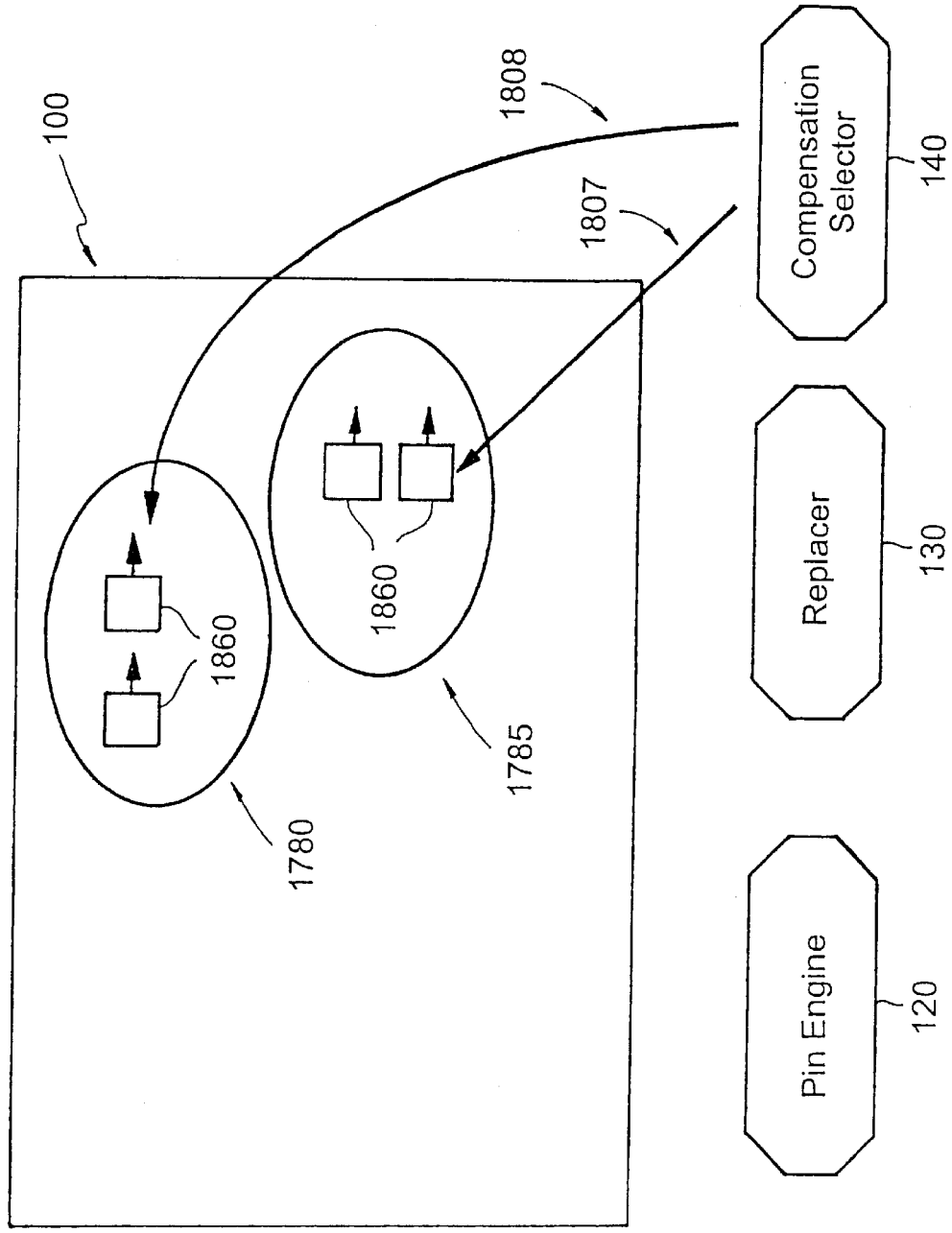
Figure 19:
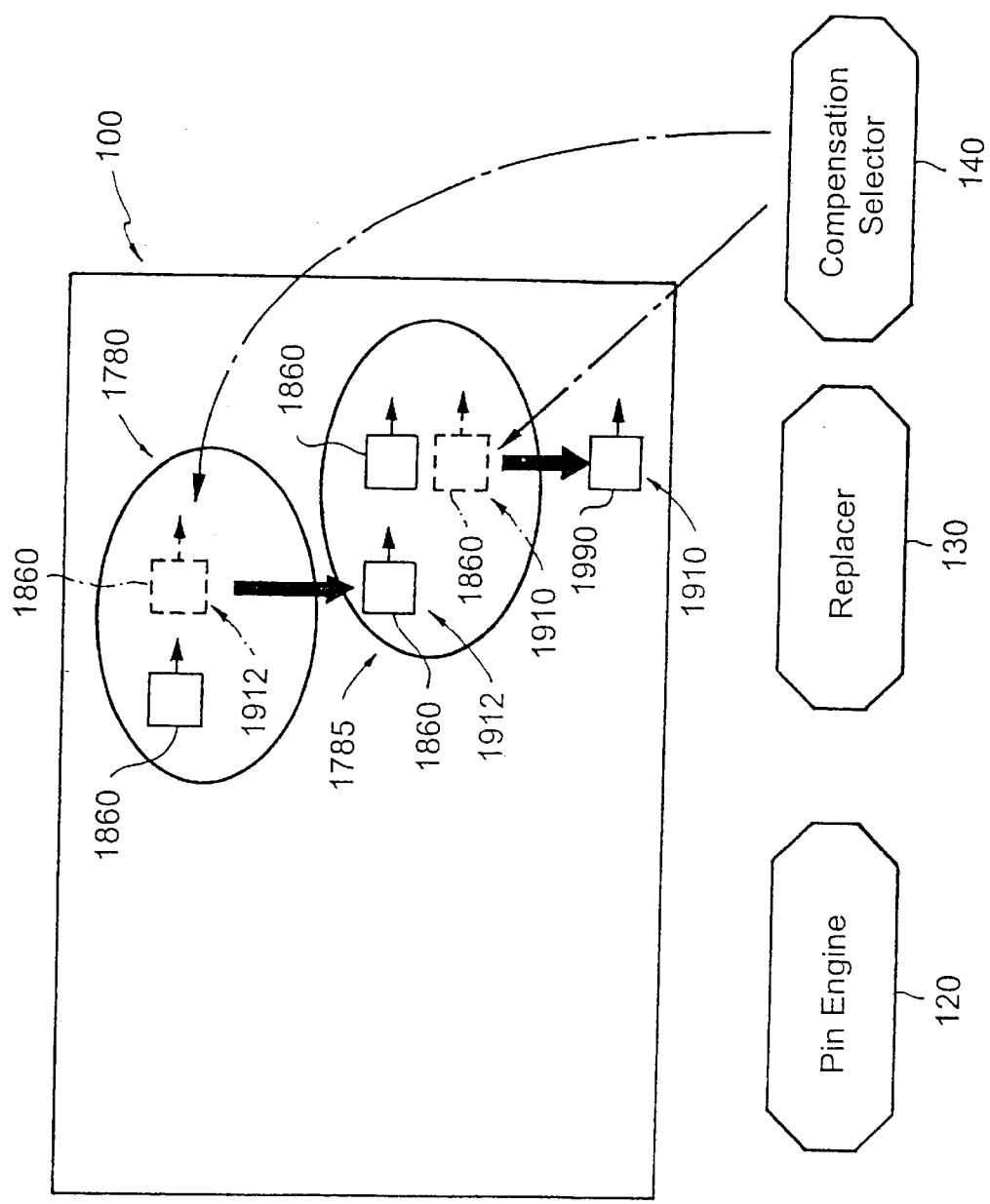

As shown in FIGS. 18 and 19, the compensation selector 140 always tries to select a compensating page that has the same color as the picked page. Therefore, the compensation selector 140 can select a compensating page 1990 as a first selected page 1910 from the compensation pool 1785 and a second selected page 1912 from the compensation set 1780. For this second selection, the compensation selector 140 will try to find a second selected page 1912 such that the distribution of colors of the pages in the compensation pool 1785 will be balanced. The first selected page 1910 is removed form the compensation pool 1785 and used as compensating page 1990. The second selected page 1912 is removed from the compensation set 1780 and added to the compensation pool 1785.

While the invention has been particularly shown and described with respect to a preferred embodiment thereof, it will be understood by those skilled in the art that the foregoing and other changes in form and details may be made therein without departing from the spirit and scope of the invention.

Having thus described our invention, what I claim as new, and desire to secure by Letters Patent is:

1. A method for enabling an application to dynamically schedule pinning of mapped pages in memory, the method comprising the steps of:
   receiving a request from the application to pin mapped pages for a limited time; and
   returning a pin constraint which includes specific constraints, in response to the receiving step, said constraints including a number of pages and page-specific times for which said pinning is granted.

2. The method as claimed in claim 1, wherein the step of receiving includes receiving a number of pages for pinning with the pin request.

3. The method as claimed in claim 1, wherein the step of receiving includes receiving specific pages to be pinned with the pin request.

4. The method as claimed in claimed 3, wherein the specified pages include mapped pages of the application.

5. The method as claimed in claim 1, wherein the step of receiving includes receiving a pinning time with the pin request.

6. The method as claimed in claim 1, wherein the step of returning includes specifying a number of pages for pinning with the pin constraint.

7. The method as claimed in claim 1, wherein the step of returning includes specifying with the pin constraint a number of pages for which pinning was denied.

8. The method as claimed in claim 1, wherein the step of returning includes specifying with the pin constraint a set of pages for which pinning is granted.

9. The method as claimed in claim 1, wherein the step of returning includes specifying with the pin constraint a set of pages for which pinning is denied.

10. The method as claimed in claim 1, wherein the step of returning includes specifying with the pin constraint time for which pinning is granted.

11. The method as claimed in claim 1, wherein the method further includes:
    estimating a duration in which the pages requested for pinning may be pinned without decreasing the system performance; and
    selecting the pin constraint according to the duration estimated before the step of returning.

12. The method as claimed in claim 1, wherein the method further includes the step of:
    unpinning any pinned pages after a predetermined period of time, the step of unpinning performed by the pin engine.

13. The method as claimed in claim 1, wherein the method further includes the step of:
    unpinning any pinned pages, the step of unpinning performed by the application.

14. The method as claimed in claim 13, wherein the step of unpinning includes unpinning specified pages.

15. The method as claimed in claim 13, wherein the step of unpinning includes unpinning the pages which the application previously pinned.

16. The method as claimed in claim 1, wherein when a replacer picks a page for replacement, the method further includes:
    (a) checking whether the picked page for replacement is one for which pinning was granted;
    (b) preventing the replacer to replace the picked page for replacement if the picked page is one for which pinning was granted;
    (c) permitting the replacer to pick another page for replacement if the picked page is one for which pinning was granted; and
    (d) replacing a page for which pinning was not granted.

17. The method as claimed in claim 16, wherein the method further includes iteratively performing the steps (a)–(c) until a page for which pinning was not granted is selected by the replacer for replacement.

18. The method as claimed in claim 1, wherein the step of sending includes specifying with the pin request compensation pages, the compensation pages for use as substitutes for pages requested for pinning.

19. The method as claimed in claim 18, wherein the step of sending includes specifying with the pin request compensation pages which are mapped pages.

20. The method as claimed in claim 18, wherein the step of sending includes specifying with the pin request compensation pages which are mapped pages belonging to the application.

21. The method as claimed in claim 18, wherein the method further includes the step of:
    entering all compensation pages that are offered by a single application in a per-application compensation set, the step of entering performed by the pin engine.

22. The method as claimed in claim 18, wherein the method further includes the step of:
    entering all compensation pages that are offered by a group of applications in a per-group compensation set, the step of entering performed by the pin engine.

23. The method as claimed in claim 18, wherein the method further includes the step of:
    entering all compensation pages that are offered in a general compensation set, the step of entering performed by the pin engine.

24. The method as claimed in claim 21, wherein when a replacement page is picked for replacement, the method further includes the steps of:
    (a) checking whether the picked replacement page is one for which pinning was granted;
    (b) replacing the picked replacement page if the picked replacement page is not one for which pinning was granted; and if the picked replacement page is one for which pinning was granted,
    (c) checking whether the compensation set associated with the application is empty, the checking step of (c) further comprising the steps of:
       (i) selecting one of pages from the compensation set if the compensation set is not empty;
       (ii) using for replacement said one of pages from the compensation set if the compensation set is not empty;
       (iii) denying the picked page for replacement if the compensation set is empty at step (i); and
       (iv) enforcing to pick another page for replacement if the compensation set is empty at step (i).

25. The method as claimed in claim 24, wherein the method further includes iteratively performing the steps (a)–(c)(iv) until a page for which pinning was not granted is picked for replacement or the compensation set is not empty at step (i).

26. The method as claimed in claim 21, wherein the method further includes the steps of:
    (a) marking all pages to be pinned and marking compensation pages initially as uncompensated, the step of marking performed by the pin engine;

(b) checking whether a picked page for replacement is one for which pinning was granted;

(c) replacing the picked page if the picked page is not for which pinning was granted, otherwise;

(d) checking whether the picked page has an associated compensating page, the checking step of (d) further comprising the steps of:

(i) using the associated compensating page for replacement if the picked page has an associated compensating page, and if the picked page does not have an associated compensating page, the checking step of (d) further comprising the steps of;

(ii) checking whether the compensation set associated with the application is empty and if the compensation set is not empty, the checking step of (d)(ii) further comprising the following steps of (aa)–(ee):

(aa) selecting one of pages in the compensation set;

(bb) removing the selected page from the compensation set;

(cc) associating the selected page as compensating page with the selected page;

(dd) making the selected page compensating;

(ee) using the selected page for replacement, and if the compensation set is empty, the checking step of (d)(ii) further comprising the following steps of (ff)–(gg):

(ff) denying to replace the originally selected page; and (gg) enforcing to pick another page for replacement.

27. The method as claimed in claim 26, wherein the method further includes iteratively performing the steps (b)–(d) until a page for which pinning was not granted is selected for replacement or the compensation set is not empty.

28. The method as claimed in claim 1, wherein the method further includes:

creating at least one compensation pool from where a compensating page may be selected.

29. The method as claimed in claim 28, wherein the method further includes:

ranking compensation pages in a compensation set according to current replacement.

30. The method as claimed in claim 28, wherein the method further includes:

ranking compensation pages in the compensation pool according to current replacement.

31. The method as claimed in claim 29, wherein the step of ranking further includes:

basing ranking according to properties of a page which was selected for replacement.

32. The method as claimed in claim 29, wherein the step of ranking further includes:

basing ranking according to a color of a page which was selected for replacement.

33. The method as claimed in claim 29, wherein the step of ranking further includes:

ranking the compensation pages in the compensation set according to the current state of the compensation pool.

34. The method as claimed in claim 33, wherein the step of ranking further includes:

ranking according to distribution of properties of pages in the compensation pool.

35. The method as claimed in claim 34, wherein the step of ranking further includes:

ranking according to distribution of colors of pages in the compensation pool.

36. The method as claimed in claim 1, wherein the method further includes:

selecting a plurality of compensation sets.

37. The method as claimed in claim 36, wherein the method further includes:

forming a hierarchy in the plurality of compensation sets.

38. The method as claimed in claim 1, wherein when application's pinned pages are unpinned the method further includes:

removing from the compensation set those compensation pages that are not used for compensation;

sending back the compensation pages which are removed from the compensation set to the application.

39. The method as claimed in claim 1, wherein when a subset of application's pinned pages are unpinned the method further includes:

removing from the compensation set an equal number of the compensation pages that are not used for compensation as the number of pages in the subset;

sending back the compensation pages which are removed from the compensation set to the application.

40. The method as claimed in claim 1, wherein the method further includes:

enabling the application to add the compensation pages to corresponding compensation sets asynchronously to pinning and unpinning requests.

41. The method as claimed in claim 1, wherein the method further includes:

enabling the application to reclaim compensation pages from corresponding compensation sets.

42. The method as claimed in claim 1, wherein the method further includes:

granting a request to reclaim compensation pages only if current pinning requests of the application can remain valid with the decreased compensation set; and denying the request, otherwise.

43. The method as claimed in claim 1, wherein the method further includes:

granting a request to reclaim compensation pages when current pinning requests of the application remain valid with the decreased compensation set; and decreasing time duration allowed for pinning, otherwise.

44. The method as claimed in claim 1, wherein the method further includes:

determining corresponding compensation set associated with the application from an application identifier.

45. The method as claimed in claim 44, wherein the method further includes:

determining corresponding compensation set associated with the application from parameters supplied by the application.

46. A program storage device readable by machine, tangibly embodying a program of instructions executable by the machine to perform method steps for enabling an application to dynamically schedule pinning of mapped pages in memory, the method steps comprising:

receiving a request from the application to pin mapped pages for a limited time; and returning a pin constraint which includes specific constraints, in response to the receiving step, said constraints including a number of pages and page-specific times for which said pinning is granted.

47. The program storage device as claimed in claim 46, wherein the method steps further comprise:

unpinning any pinned pages.

48. The program storage device as claimed in claim 46, wherein the method steps further comprise:

inserting compensation pages into a compensation set from where a page is selected for replacement in place of pages to be pinned.

49. The program storage device as claimed in claim 48, wherein the method steps further comprise:

selecting a first compensation page from compensation pool;

associating the first compensation page as a compensating page for a to-be-pinned page;

selecting a second compensation page from the compensation set, wherein the second compensation page is selected such that distribution of colors in the compensation pool is maintained if the second compensation page was added to the compensation pool; and moving the compensation page from the compensation set to the compensation pool.

50. The program storage device as claimed in claim 49, wherein the method steps further comprise:

selecting the first compensation page from compensation pool which has a same color as the to-be-pinned page.

51. A system for enabling an application to dynamically schedule pinning of mapped pages for a limited time in a paged memory system, the system comprising:

a pin engine for controlling a scheduling of dynamic pinning, the pin engine further granting pinning requests from the application based on predetermined criteria and subject to a set of constraints; and a compensation selector for selecting a compensation page for substituting one or more pin page during page replacement for allowing the pin page to remain pinned, wherein the application is enabled to pin its pages according to the set of constraints, said constraints including a number of pages and page-specific times for which said pinning is granted.

52. The system for enabling an application to pin mapped pages for a limited time in a paged memory system as claimed in claim 51, the system further comprising:

a compensation pool from which the compensation selector selects a compensation page accordingly to a ranking based on predetermined criteria.

53. The system for enabling an application to pin mapped pages for a limited time in a paged memory system as claimed in claim 52, wherein the predetermined criteria is color.

* * * * *